United States Patent
Kikuchi et al.

(10) Patent No.: US 11,411,284 B2
(45) Date of Patent: Aug. 9, 2022

(54) LAMINATE AND SECONDARY BATTERY

(71) Applicants: KABUSHIKI KAISHA TOSHIBA, Minato-ku (JP); Toshiba Infrastructure Systems & Solutions Corporation, Kawasaki (JP)

(72) Inventors: Yuma Kikuchi, Kashiwazaki (JP); Hironori Takatsuka, Kashiwazaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 57 days.

(21) Appl. No.: 16/290,049

(22) Filed: Mar. 1, 2019

(65) Prior Publication Data
US 2019/0273236 A1    Sep. 5, 2019

(30) Foreign Application Priority Data

Mar. 1, 2018    (JP) .............................. JP2018-036799

(51) Int. Cl.
*H01M 50/44*    (2021.01)
*H01M 50/46*    (2021.01)
(Continued)

(52) U.S. Cl.
CPC ........... *H01M 50/46* (2021.01); *H01M 4/043* (2013.01); *H01M 4/0411* (2013.01); *H01M 4/13* (2013.01);
(Continued)

(58) Field of Classification Search
CPC .. H01M 2/1673; H01M 2/162; H01M 2/1613; H01M 50/44; H01M 50/46
See application file for complete search history.

(56) References Cited

U.S. PATENT DOCUMENTS

2002/0197535 A1    12/2002  Dudley et al.
2011/0129722 A1*    6/2011  Yoneda ................. H01M 4/661
                                                                    429/162
(Continued)

FOREIGN PATENT DOCUMENTS

EP    3 300 140 A1    3/2018
JP    2012-74359 A    4/2012
(Continued)

OTHER PUBLICATIONS

Extended European Search Report dated Aug. 1, 2019 in corresponding European Patent Application No. 19159399.5, 14 pages.

*Primary Examiner* — James Lee
(74) *Attorney, Agent, or Firm* — Oblon, McClelland, Maier & Neustadt, L.L.P.

(57) ABSTRACT

According to one embodiment, there is provided a laminate including a first current collector, a first current collector tab, a first active material-containing layer, and a first film containing an inorganic material. A back surface of the first active material-containing layer is supported on at least a part among front and back surfaces of the first current collector. A first thickness at a first end surface of the first active material-containing layer is smaller than a second thickness at a second end surface facing reverse with respect to the first end surface. The first film covers at least the first end surface of the first active material-containing layer and a portion among front and back surfaces of the first current collector tab adjacent to the first end surface.

9 Claims, 12 Drawing Sheets

(51) Int. Cl.
*H01M 50/463* (2021.01)
*H01M 4/36* (2006.01)
*H01M 4/04* (2006.01)
*H01M 4/13* (2010.01)
*H01M 4/485* (2010.01)
*H01M 4/139* (2010.01)
*H01M 10/04* (2006.01)
*H01M 4/70* (2006.01)
*H01M 50/411* (2021.01)
*H01M 50/531* (2021.01)
*H01M 10/058* (2010.01)
*H01M 4/02* (2006.01)
*H01M 10/052* (2010.01)

(52) U.S. Cl.
CPC ........... *H01M 4/139* (2013.01); *H01M 4/366* (2013.01); *H01M 4/485* (2013.01); *H01M 4/70* (2013.01); *H01M 10/0431* (2013.01); *H01M 50/411* (2021.01); *H01M 50/44* (2021.01); *H01M 50/463* (2021.01); *H01M 50/531* (2021.01); *H01M 10/052* (2013.01); *H01M 10/058* (2013.01); *H01M 2004/021* (2013.01)

(56) References Cited

U.S. PATENT DOCUMENTS

| | | |
|---|---|---|
| 2011/0217585 A1 | 9/2011 | Wang et al. |
| 2012/0058375 A1 | 3/2012 | Tanaka et al. |
| 2015/0162584 A1 | 6/2015 | Uematsu et al. |
| 2016/0294015 A1 | 10/2016 | Tanaka et al. |
| 2017/0317390 A1 | 11/2017 | Sato |
| 2019/0036095 A1 | 1/2019 | Uematsu et al. |

FOREIGN PATENT DOCUMENTS

| | | |
|---|---|---|
| JP | 2014-041817 | 3/2014 |
| JP | 2014-60118 | 4/2014 |
| JP | 2014-60123 | 4/2014 |
| WO | 2013/031213 A1 | 3/2013 |
| WO | WO 2016/067706 A1 | 5/2016 |
| WO | WO 2018/179205 A1 | 10/2018 |

\* cited by examiner

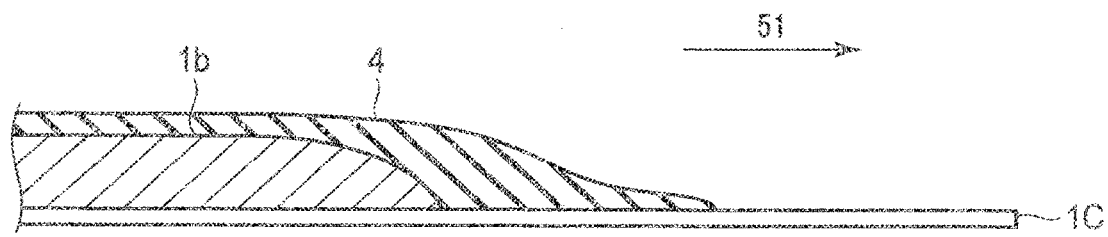
F I G. 3
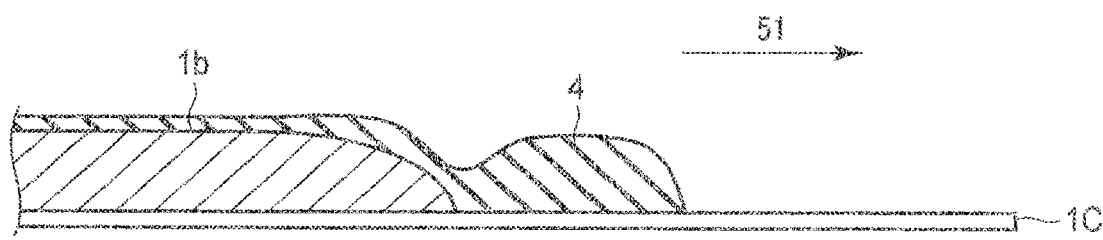
F I G. 4
F I G. 5
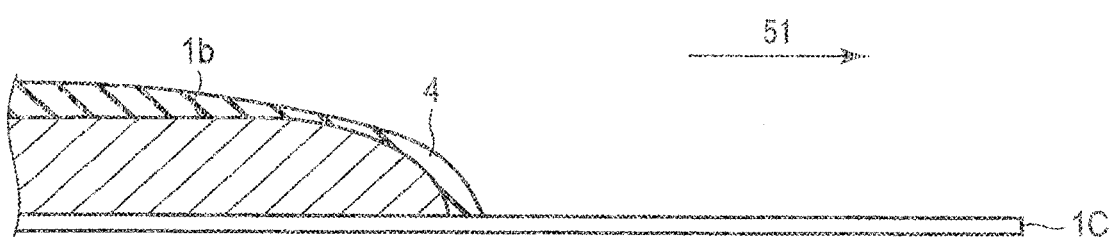
F I G. 6

LAMINATE AND SECONDARY BATTERY

CROSS-REFERENCE TO RELATED APPLICATIONS

This application is based upon and claims the benefit of priority from the Japanese Patent Application No. 2018-036799, filed Mar. 1, 2018, the entire contents of which are incorporated herein by reference.

FIELD

Embodiments described herein relate generally to a laminate and a secondary battery.

BACKGROUND

In a secondary battery such as a lithium secondary battery, a porous separator is disposed between a positive electrode and a negative electrode so as to avoid contact between the positive electrode and the negative electrode. As the separator, a self-supported film which is separate from the positive electrode and the negative electrode is used. An example of this is a microporous film made of a polyolefin-based resin. Such a separator is produced, for example, by extruding a melt containing a polyolefin-based resin composition into a sheet, extracting and removing substances other than the polyolefin-based resin, and stretching the sheet.

Since it is necessary for the separator made of the resin film to have mechanical strength so as not to tear during production of a battery, it is difficult to make the separator thin beyond a certain extent. The positive electrode and the negative electrode are laminated or wound while interposing the separator therebetween. Therefore, if the separator is thick, the number of layers of the positive electrode and the negative electrode that can be stored per unit volume of the battery is limited. As a result, the battery capacity is reduced. In addition, the separator made of the resin film has poor durability, and if used in the secondary battery, the separator deteriorates as the charge and discharge are repeated, and the cycle property of the battery deteriorates.

In order to reduce the thickness of the separator, integration of a nanofiber film into either the positive electrode or the negative electrode is being considered. Regarding the electrode-integrated separator, there is a problem that the separator easily peels off from the electrode.

BRIEF DESCRIPTION OF THE DRAWINGS

FIG. 3 is a cross-sectional view illustrating an example of a shape of an end portion including a first end surface of a first active material-containing layer;

FIG. 4 is a cross-sectional view illustrating an example of a shape of an end portion including a first end surface of a first active material-containing layer;

FIG. 5 is a cross-sectional view illustrating an example of a shape of an end portion including a first end surface of a first active material-containing layer;

FIG. 6 is a cross-sectional view illustrating an example of a shape of an end portion including a first end surface of a first active material-containing layer;

DETAILED DESCRIPTION

According to one embodiment, there is provided a laminate including a first current collector having a first collector front surface and a first collector back surface, a first current collector tab extending from the first current collector in a first direction, a first active material-containing layer, and a first film containing an inorganic material. The first active material-containing layer has a first layer front surface and a first layer back surface. The first layer back surface of the first active material-containing layer is supported on at least a part among the first collector front surface and the first collector back surface of the first current collector. The first active material-containing layer includes a first end surface adjacent to the first current collector tab and a second end surface facing in a reverse direction with respect to the first end surface. A first thickness defined at the first end surface of the first active material-containing layer is smaller than a second thickness defined at the second end surface of the first active material-containing layer. The first film covers at least the first end surface of the first active material-containing layer and a portion among a first tab front surface and a first tab back surface of the first current collector tab adjacent to the first end surface.

In addition, according to another embodiment, a secondary battery including the laminate according to the embodiment is provided.

First Embodiment

A laminate according to a first embodiment will be described with reference to the drawings.

Figure 1:
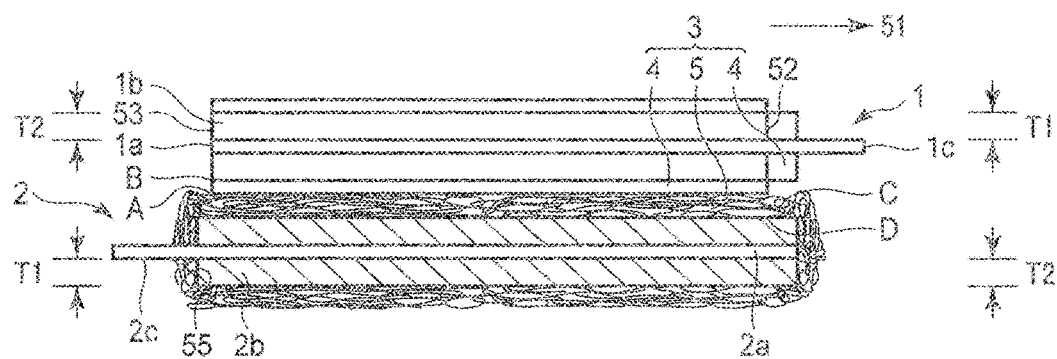
FIG. 1 is a cross-sectional view illustrating an example of a laminate according to an embodiment.
Figure 2:
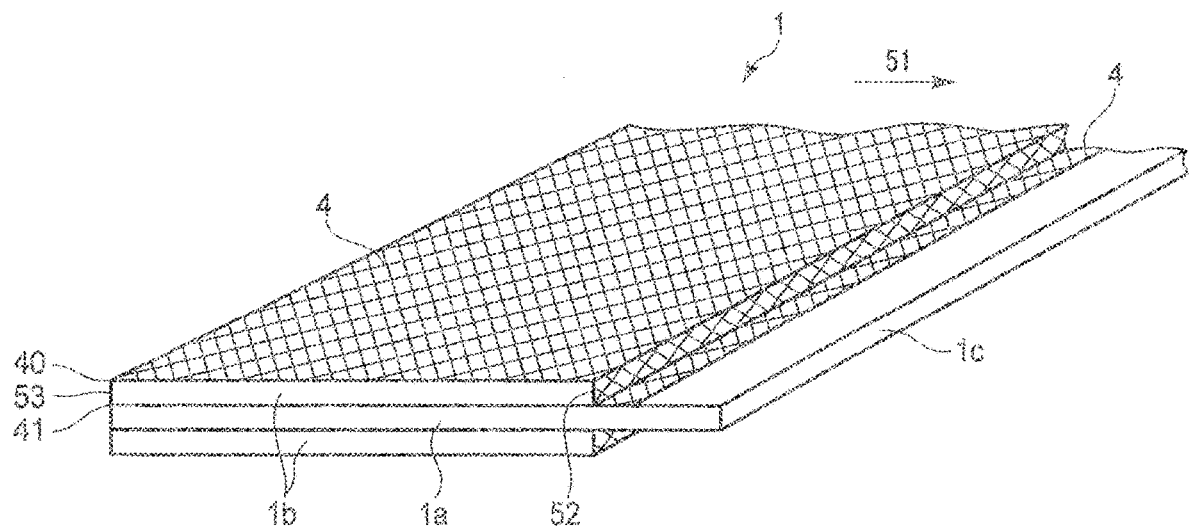
FIG. 2 is a perspective view illustrating a first electrode of the laminate illustrated in FIG. 1.

FIG. 1 is a cross-sectional view illustrating an example of a laminate according to the embodiment. The cross-sectional view of FIG. 1 is a cross-sectional view of a laminate that is cut in a first direction, which is an extending direction of a current collector tab. The laminate illustrated in FIG. 1 includes a first electrode 1, a second electrode 2, and a separator 3. As illustrated in FIGS. 1 and 2, the first electrode 1 includes a first current collector 1a, a first active material-containing layer 1b, and a first current collector tab 1c. The first active material-containing layer 1b has a first front surface 40 and a first back surface 41. Herein, the first front surface 40 may be referred to as a first layer front surface. The first back surface 41 may be referred to as a first layer back surface, similarly. The first current collector tab 1c is an extension of the first current collector 1a in a first direction 51. The first current collector 1a is an electro-conductive sheet having a front surface and a back surface. One principal surface of the first current collector 1a is the front surface, and the other principal surface thereof is the back surface. Herein, the front surface of the first current collector 1a may be referred to as a first collector front surface. The back surface of the first current collector 1a may be referred to as a first collector back surface, similarly. Each of four side surfaces of the first current collector 1a is orthogonal to the front surface and the back surface. The first active material-containing layer 1b is supported on the front surface and the back surface respectively at sections of the first current collector 1a excluding a portion that serves as the first current collector tab 1c. On each of the front surface and the back surface of the first current collector 1a, the active material-containing layer is not supported on one side (for example, a long side or a short side) and in the vicinity thereof. An active material-containing layer non-supporting portion that is formed parallel to one side of the first current collector 1a functions as the first current collector tab 1c. Among the surfaces of the first active material containing layer 1b, the face that is in contact with the first current collector 1a is the first back surface 41. The first active material-containing layer 1b has two sets of end surfaces facing in reverse directions relative to each other. One set of end surfaces thereof is perpendicular to the first direction 51. One of the end surfaces in this set is a first end surface 52 adjacent to the first current collector tab 1. The first end surface 52 faces towards a direction opposite with respect to a second end surface 53 along the first direction 51. In addition, a thickness T1 defined at the first end surface 52 of the first active material-containing layer 1b is smaller than a thickness T2 defined at the second end surface 53 of the first active material-containing layer 1b. Herein, the thickness T1 at the first end surface 52 may be referred to as a first thickness. The thickness T2 at the second end surface 53 may be referred to as a second thickness, similarly. A method of measuring the thicknesses T1 and T2 will be described below.

The secondary battery is disassembled under an argon gas atmosphere, and an electrode group is taken out from a container member of the secondary battery. The electrode group is unwound and about 10 mm×10 mm of a measurement sample is cut-out. The cut-out sample is added to a beaker filled with ethyl methyl carbonate (EMC) and stirred, and is washed for 30 minutes. The washed sample is dried. Section milling is performed on the sample by using an ion milling apparatus (IM4000PLUS manufactured by Hitachi High-Technologies Corporation). A cross section obtained by the section milling is observed with, for example, a scanning electron microscope (TM3030Plus manufactured by Hitachi High-Technologies Corporation) so as to measure thicknesses T1 and T2.

FIGS. 3 to 10 illustrate examples of cross-sectional shapes obtained by cutting the end portion including the first end surface 52 along the first direction 51. At each of the end portions illustrated in FIGS. 3 to 10, the thickness of the first active material-containing layer 1b decreases toward the first direction 51 and becomes minimum at the first end surface 52. At the end portions illustrated in FIGS. 3, 4, 6, 9, and 10, the thickness of the end portion of the first active material-containing layer 1b gradually decreases and becomes minimum at the first end surface 52. The end portion including the first end surface 52 has a substantially semi-cylindrical shape extending in a direction orthogonal to the first direction 51. At the end portions illustrated in FIGS. 5 and 8, the thickness of the end portion of the first active material-containing layer 1b decreases such that the longitudinal sectional shape depicts a needle shape or a dome shape, and becomes minimum at the first end surface 52. On the other hand, at the end portion illustrated in FIG. 7, the thickness of the end portion of the first active material-containing layer 1b decreases such that the longitudinal sectional shape depicts a protrusion, and becomes minimum at the first end surface 52. In order to increase the contact area with the current collector, the shapes of the end portions illustrated in FIGS. 3, 4, 6, 9, and 10 are desirable.

Figure 11:
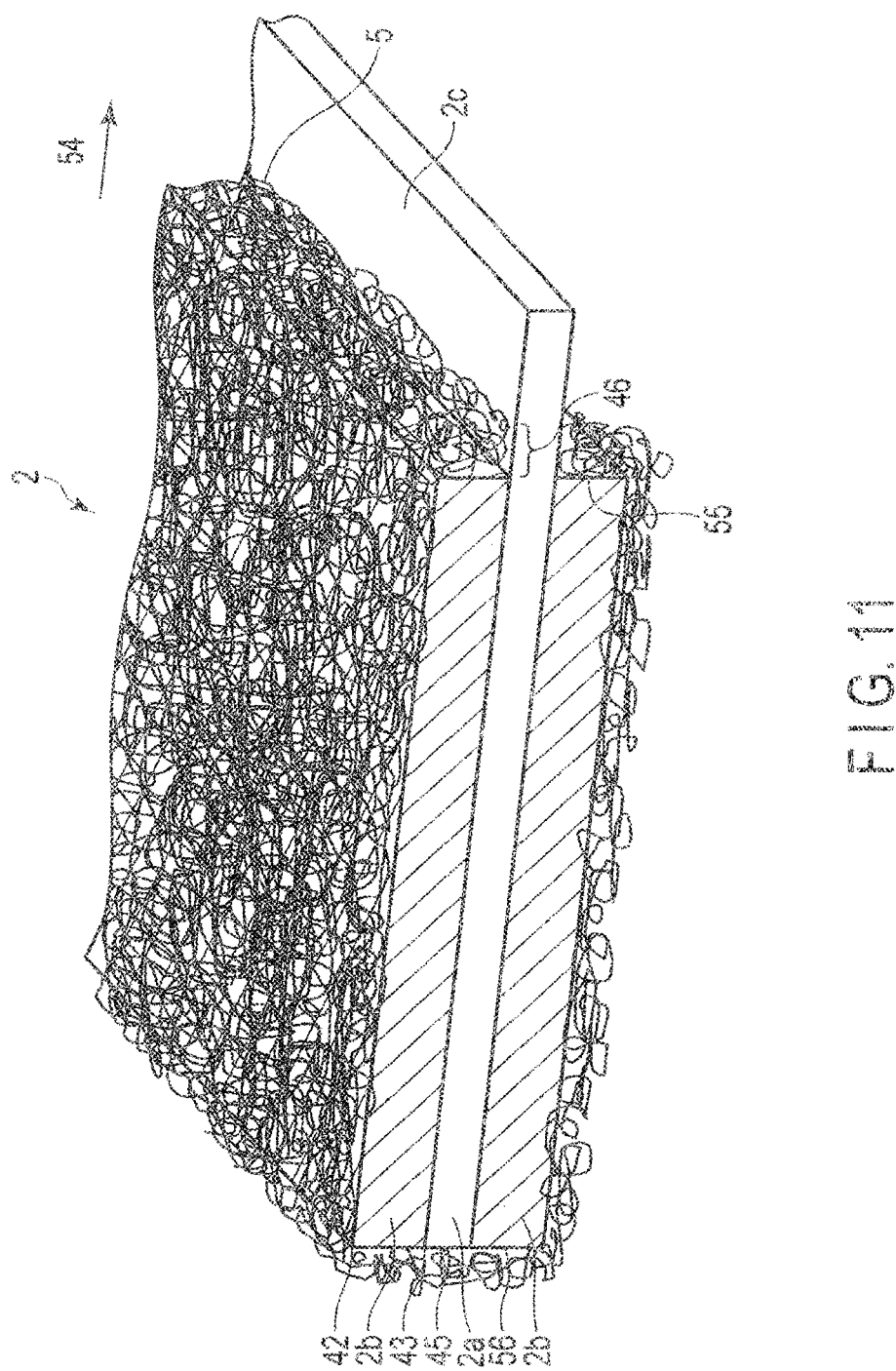
FIG. 11 is a perspective view illustrating a second electrode of the laminate illustrated in FIG. 1.

As illustrated in FIG. 11, the second electrode 2 includes a second current collector 2a, a second active material-containing layer 2b, and a second current collector tab 2c. The second active material-containing layer 2b has a second front surface 42 and a second back surface 43. Herein, the second front surface 42 may be referred to as a second layer front surface. The second back surface 43 may be referred to as a second layer back surface, similarly. The second current collector tab 2c is an extension of the second current collector 2a in a second direction 54. The second current collector 2a is an electro-conductive sheet having a front surface and a back surface. Herein, the front surface of the second current collector 2a may be referred to as a second collector front surface. The back surface of the second current collector 2a may be referred to as a second collector back surface, similarly. One principal surface of the second current collector 2a is the front surface, and the other principal surface thereof is the back surface. Each of four side surfaces of the second current collector 2a is orthogonal to the front surface and the back surface. The second active material-containing layer 2b is supported on a front surface and a back surface respectively at sections of the second current collector 2a excluding a portion that serves as the second current collector tab 2c. On each of the front surface and the back surface of the second current collector 2a, the active material-containing layer is not supported on one side and in the vicinity thereof. An active material-containing layer non-supporting portion that is formed parallel to one side of the second current collector 2a functions as the second current collector tab 2c. Among the surfaces of the second active material-containing layer 2b, a face that is in contact with the second current collector 2a is the second back surface 43. The second active material-containing layer 2b has two sets of end surfaces facing in directions reverse from each other. One set of end surfaces thereof is perpendicular to the second direction 54. One of the end surfaces in the set is a first end surface 55 adjacent to the second current collector tab 2c. The first end surface 55 faces towards a direction opposite from a second end surface 56 along the second direction 54. A thickness T1 defined at the first end surface 55 of the second active material-containing layer 2b may be smaller than a thickness T2 defined at the second end surface 56 of the second active material-containing layer 2b.

Figure 7:
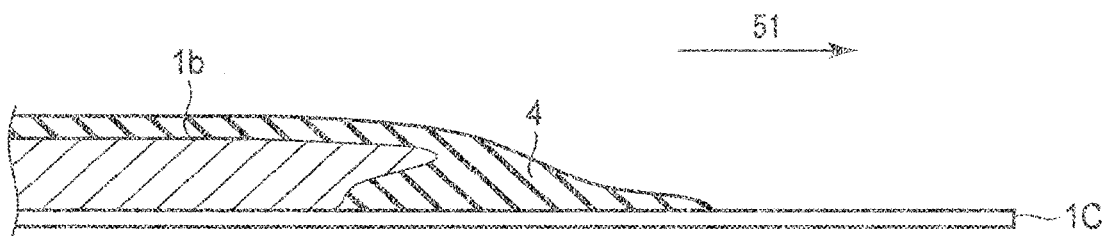
FIG. 7 is a cross-sectional view illustrating an example of a shape of an end portion including a first end surface of a first active material-containing layer.
Figure 8:
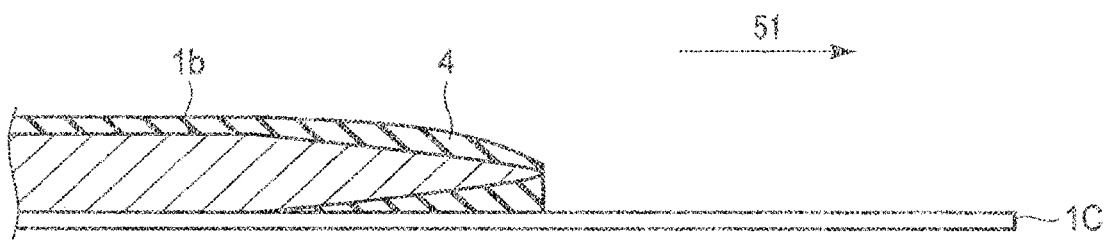
FIG. 8 is a cross-sectional view illustrating an example of a shape of an end portion including a first end surface of a first active material-containing layer.
Figure 9:
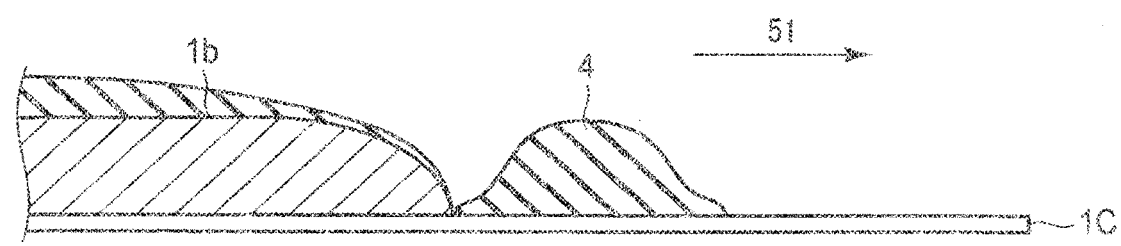
FIG. 9 is a cross-sectional view illustrating an example of a shape of an end portion including a first end surface of a first active material-containing layer.
Figure 10:
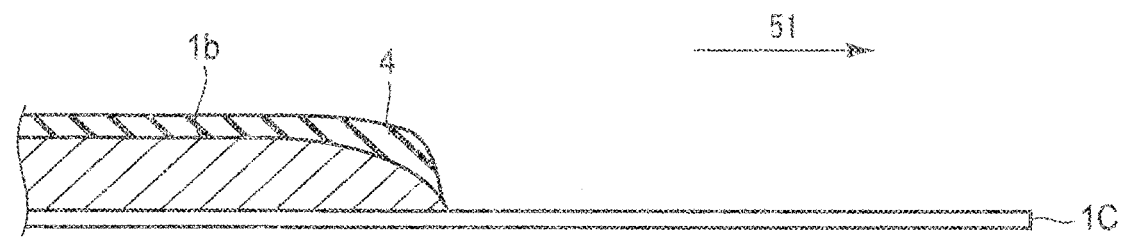
FIG. 10 is a cross-sectional view illustrating an example of a shape of an end portion including a first end surface of a first active material-containing layer.

The separator 3 includes a first film 4 containing an inorganic material and a second film 5 containing an organic fiber. The first film 4 has a front surface A and a back surface B, and the second film 5 has a front surface C and a back surface D. As illustrated in FIGS. 1 and 2, the back surface B of the first film 4 is in contact with and covers the first front surface 40 of each of the first active material-containing layers 1b. For each of the two first active material-containing layers 1b, the first end surface 52 among the four side surfaces orthogonal to the main surface is covered with the first film 4. The first film 4 also covers a portion adjacent to the first end surface 52 of the first active material-containing layer 1b on each of the front surface and the back surface of the first current collector tab 1c, that is, a boundary portion between each of the front surface and the back surface of the first current collector tab 1c and the first end surface 52. Note that the front surface of the first current collector tab is may be referred to as a first tab front surface, herein. In a similar manner, the back surface of the first current collector tab 1c may be referred to as a first tab back surface. The portion of the first film 4 adjacent to the first end surface 52 is located at a position close to the end surface of the second electrode located on the opposite side of the side where the second current collector tab 2c extends. An internal short circuit caused by the contact between the first current collector tab 1c of the first electrode and the end surface of the second electrode can be reduced by providing the first film 4. The form in which the first film 4 covers the first end surface 52 of the first active material-containing layer 1b and the portion adjacent to the first end surface 52 is not particularly limited, but for example, examples illustrated in FIGS. 3 to 10 can be taken. In FIG. 3, the first film 4 covers an end portion including the first end surface 52 of the first active material-containing layer 1b (hereinafter, referred to as an end portion) so as to follow the outer shape thereof. In addition, the first film 4 covers a portion adjacent to the first end surface 52 (hereinafter, referred to as an adjacent portion) with a sufficient width, and the thickness thereof decreases along the first direction 51. In FIG. 4, the first film 4 covers an end portion including the first end surface 52 of the first active material-containing layer 1b so as to follow the outer shape thereof. In addition, the first film 4 covers the adjacent portion with a sufficient width and thickness. In FIG. 5, the first film 4 covers an end portion of the first active material-containing layer 1b so as to follow the outer shape thereof. In addition, the first film 4 covers an adjacent portion with a sufficient width, and the thickness thereof decreases along the first direction 51. In FIG. 6, the first film 4 covers an end portion of the first active material-containing layer 1b so as to follow the outer shape thereof. In FIG. 7, the first film 4 covers the end portion of the first active material-containing layer 1b and also covers the adjacent portion with a sufficient width, and the thickness thereof decreases along the first direction 51. In FIG. 8, the first film 4 covers the periphery of the end portion of the first active material-containing layer 1b. In FIG. 9, the first film 4 covers the end portion and the adjacent portion of the first active material-containing layer 1b. However, the portion covering the adjacent portion is not continuous with respect to the portion covering the end portion, and the portions are independent of each other. In FIG. 10, the first film 4 covers a part of the end portion of the first active material-containing layer 1b.

In order to enhance the effect of suppressing separation of the first film 4 from the first active material-containing layer 1b, the structures illustrated in FIGS. 3 to 6 are preferable.

There is no particular limitation on how the first film 4 is fixed to the first active material-containing layer 1b. Examples include bonding and thermal fusion.

On the other hand, as illustrated in FIG. 11, the second film 5 covers the second front surface 42 and four side surfaces (including end surfaces 55 and 56) orthogonal to the second front surface 42 of each of the second active material-containing layers 2b, three end surfaces 45 of the second current collector 2a that are exposed on the surface of the second electrode 2, and the portion 46 adjacent to the end surface 55 of the second active material-containing layer 2b on the front and back surfaces of the second current collector tab 2c. Note that the front surface of the second current collector tab 2c may be referred to as a second tab front surface, herein. In a similar manner, the back surface of the second current collector tab 2c may be referred to as a second tab back surface. Therefore, the first active material-containing layer 1b and the second active material-containing layer 2b face each other through the first film 4 and the second film 5. The second film may be integrated with the second electrode, but is not limited thereto. For example, the second film may be integrated onto the surface of the first film. There is no particular limitation on how the second film is integrated with the first film or the second active material-containing layer. An example is a state in which an organic fiber in the second film is embedded in or stuck in the front surface of the first film or the second active material-containing layer.

As illustrated in the above-described examples, in the laminate according to the first embodiment, the thickness defined at the first end surface of the first active material-containing layer is smaller than the thickness defined at the second end surface of the first active material-containing layer. In addition, the first film covers the front surface and the first end surface of the first active material-containing layer, and the portion on the front and back surfaces of the first current collector tab adjacent to the first end surface of the first active material-containing layer. According to such a structure, the separation of the first film from the first active material-containing layer can be suppressed. As a result, when an electrode group is produced by winding the laminate in a spiral shape or the like, or when a load of the laminate into the container member is increased, in order to obtain high capacity, peeling of the first film from the first active material-containing layer can be suppressed. Therefore, the occurrence of an internal short circuit can be suppressed, and a high capacity battery can be provided. Therefore, the laminate has excellent practicality. In addition, it is possible to alleviate a volume change due to expansion and contraction accompanying the charge and discharge on the first end surface side of the first active material-containing layer. As a result, the first film easily follows the deformation of the first active material-containing layer, and peeling from the first active material-containing layer can be suppressed. Therefore, it is possible to improve the life such as the charge-and-discharge cycle life of the battery.

Figure 12:
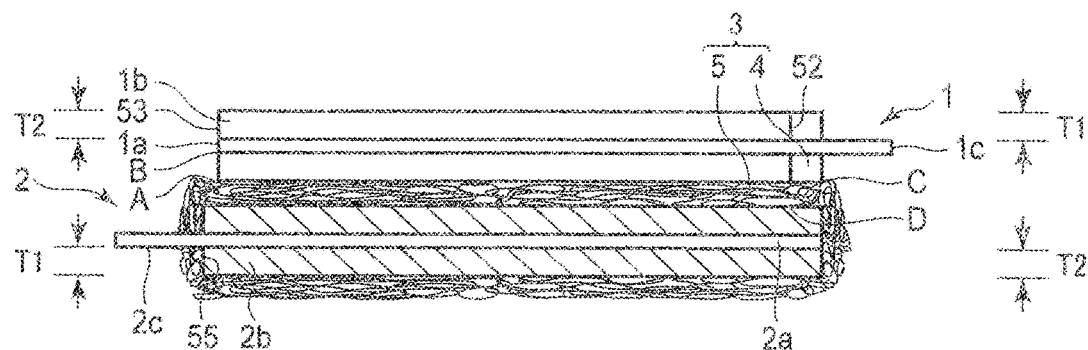
FIG. 12 is a cross-sectional view illustrating another example of a laminate according to the embodiment.

In FIG. 1, the front surface of the first active material-containing layer is covered with the first film, but the embodiment is not limited to this form. It is also possible to only cover the first end surface of the first active material-containing layer and the portion among the front and back surfaces of the first current collector tab adjacent to the first end surface of the first active material-containing layer with the first film. An example of this is illustrated in FIG. 12. In this case, the second film 5 covers the second front surface and four side surfaces (including the end surface 55) orthogonal to the second front surface of each of the second active material-containing layers 2b, three end surfaces of the second current collector 2a exposed on the surface of the second electrode 2, and the portion of the second current collector tab 2c that is adjacent to the end surface 55 of the second active material-containing layer 2b on the front and back surfaces. Therefore, the first active material-containing layer 1b and the second active material-containing layer 2b face each other through the second film 5. Therefore, since the insulating property between the first electrode and the second electrode is maintained without covering the front surface of the first active material-containing layer with the first film, it is possible to realize a high capacity and long life battery.

Figure 13:
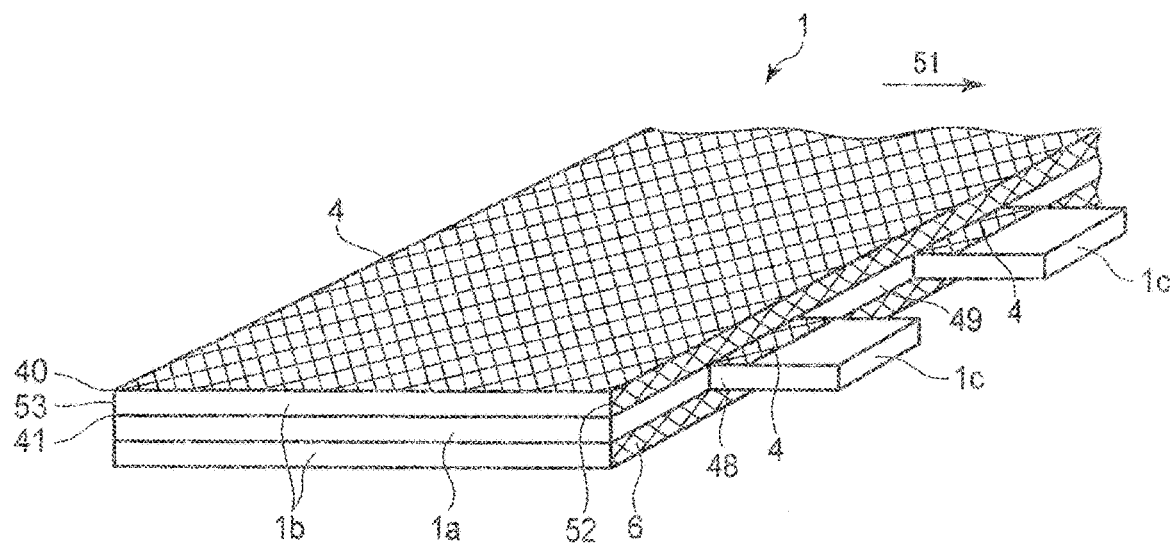
FIG. 13 is a perspective view illustrating another example of a first electrode.

It is to be noted that the first and second current collector tabs are not limited to the one side of the first and second current collectors not supporting the active material-containing layer. For example, plural strip-shaped portions protruding from one side surface of the first and second current collectors can be used as the first and second current collector tabs. An example of this is illustrated in FIG. 13. FIG. 13 illustrates another example of the first electrode 1. As illustrated in FIG. 13, plural strip-shaped portions protruding from one side surface (for example, one side surface along the long side) of the first current collector 1a may be used as the first current collector tab 1c. The first film 4 covers the front surface and the first end surface 52 of the first active material-containing layer 1b, and the portion of the front and back surfaces of the first current collector tab 1c adjacent to the first end surface 52. The other three end surfaces of the first active material-containing layer 1b, the four side surfaces of the first current collector 1a, or the two opposite side surfaces of each first current collector tab 1c may be covered with the first film 4. The first film 4 on the front surface of the first active material-containing layer 1b may be omitted by providing a separator composed of the second film 5 or the like between the front surface of the first active material-containing layer 1b and the front surface of the second active material-containing layer 2b.

Figure 14:
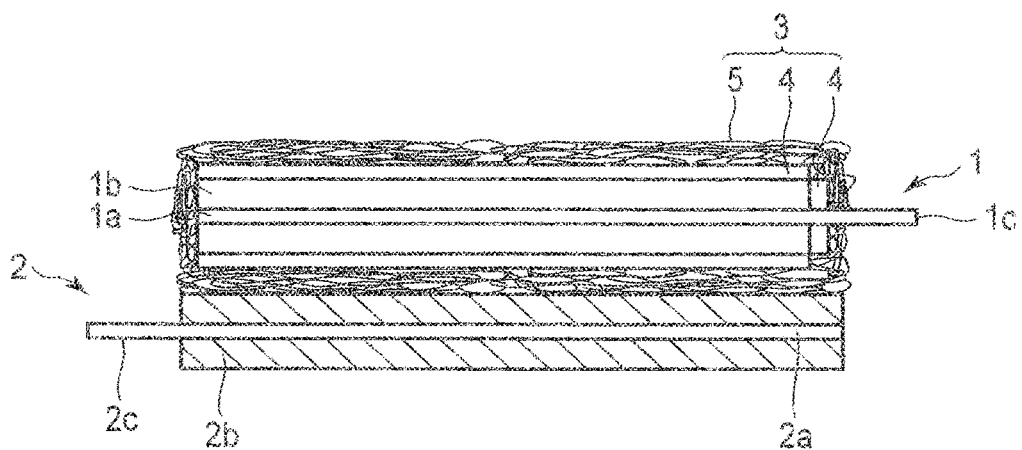
FIG. 14 is a cross-sectional view illustrating another example of a laminate according to the embodiment.
Figure 15:
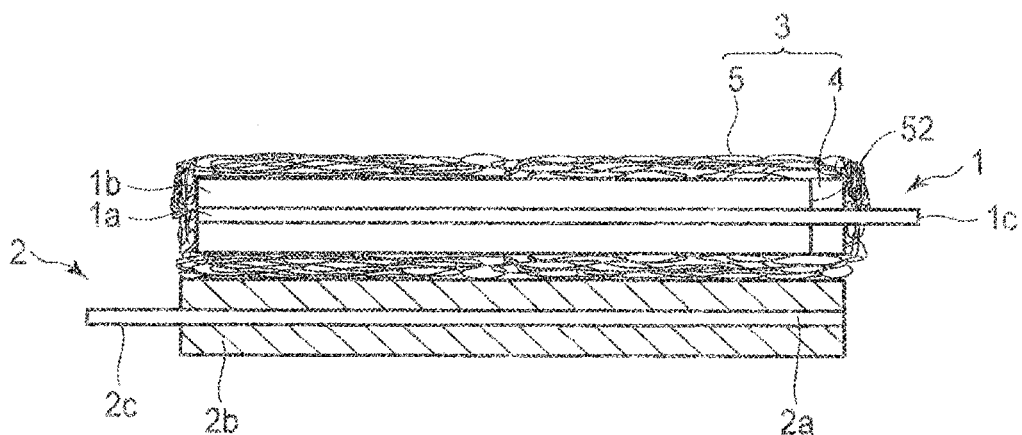
FIG. 15 is a cross-sectional view illustrating another example of a laminate according to the embodiment.

In addition, the second film 5 may be integrated with the first electrode 1. An example of this is illustrated in FIGS. 14 and 15. In FIG. 14, the second film 5 covers the front surface of the first film 4 and the electrode end surfaces not covered with the first film 4, that is, three electrode end surfaces from which the first current collector tab 1c does not extend. On the other hand, in FIG. 15, the first film 4 covers the first end surface 52 of the first active material-containing layer 1b, and the portion of the front and back surfaces of the first current collector tab 1c that is adjacent to the first end surface 52. The second film 5 covers the front surface of the first film 4 and the electrode end surfaces not covered with the first film 4, that is, the front surface of the first active material-containing layer 1b and three electrode end surfaces from which the first current collector tab 1c do not extend. According to the configurations of FIG. 14 and FIG. 15, the separation of the first film from the first active material-containing layer can be suppressed while ensuring the necessary insulating property between the first electrode and the second electrode. Therefore, the capacity and the charge-and-discharge cycle life of the battery can be improved.

In addition, the first film may be formed on both the first electrode and the second electrode. Thereby, the adhesion between the first film and the electrode can be further enhanced. In addition, in this case, it is possible to interpose the second film between the first electrode and the second electrode. With this configuration, the insulation between the first electrode and the second electrode can be made more reliable. The second film can be formed on either or both of the first electrode and the second electrode.

Hereinafter, the first and second electrodes, the first film, and the second film will be described.

First and Second Electrodes

The opposite electrode with respect to the first electrode is the second electrode. The electrodes may be a pair where the first electrode is a positive electrode and the second electrode is a negative electrode, or alternatively, a pair where the first electrode is a negative electrode and the second electrode is a positive electrode.

The first electrode includes a porous first active material-containing layer having a first front surface and a first back surface. On the other hand, the second electrode includes a porous second active material-containing layer having a second front surface and a second back surface.

The first electrode may further include a first current collector and a first current collector tab. On the other hand, the second electrode may further include a second current collector and a second current collector tab. In this case, the first and second active material-containing layers may be formed on both the front surface and the back surface of the first and second current collectors, respectively. The first and second active material-containing layers may also be formed on only one of the respective surfaces.

For the active materials of the first and second active material-containing layers, a positive electrode active material and a negative electrode active material are used. The active material may be of one species, or of two or more species.

As the positive electrode active material, for example, a lithium transition metal composite oxide may be used. Examples include $LiCoO_2$, $LiNi_{1-x}Co_xO_2$ (0<x<0.3), $LiMn_xNi_yCo_zO_2$ (0<x<0.5, 0<y<0.5, 0≤z<0.5), $LiMn_{2-x}M_xO_4$ (M is at least one selected from the group consisting of Mg, Co, Al, and Ni, 0<x<0.2), $LiMPO_4$ (M is at least one selected from the group consisting of Fe, Co, and Ni), and the like.

As the negative electrode active material, carbon materials including graphite or the like, tin-silicon-based alloy materials, and the like may be used, but lithium titanate is preferably used. In addition, oxides of titanium or lithium titanate containing other metals such as niobium (Nb) may also be used as the negative electrode active material. Examples of lithium titanate include $Li_{4+x}Ti_5O_{12}$ (0≤x≤3) having a spinel structure and $Li_{2+y}Ti_3O_7$ (0≤y≤3) having a ramsdellite structure.

Since the first active material-containing layer or the second active material-containing layer contains the titanium-containing oxide as the active material, it is possible to avoid precipitation of lithium dendrite in the first film or the second film. Therefore, it is possible to improve the charge-and-discharge cycle life of the secondary battery.

The active material may be single primary particles, secondary particles in which primary particles are agglomerated, or a mixture of primary particles and secondary particles.

The average particle size of the primary particles of the negative electrode active material is preferably in the range of 0.001 µm to 1 µm. The average particle size can be obtained by, for example, observing the negative electrode active material with a scanning electron microscope (SEM). The particle shape may be granular or fibrous. In the case of the fibrous form, the fiber diameter is preferably 0.1 µm or less. Specifically, the average particle size of the primary particles of the negative electrode active material can be measured from an image observed with an electron microscope (SEM). In the case where lithium titanate having an average particle size of 1 µm or less is used as the negative electrode active material, a negative electrode active material-containing layer having high surface flatness can be obtained. In addition, when lithium titanate is used, a negative electrode potential becomes more noble than that of a lithium ion secondary battery using a common carbon negative electrode. Therefore, precipitation of lithium metal does not occur in principle. Since the expansion and contraction associated with the charge-and-discharge reaction is small for the negative electrode active material containing lithium titanate, the crystal structure of the active material can be prevented from disintegrating.

In addition to the active material, the first and second active material-containing layers may include a binder and an electro-conductive agent. Examples of the electro-conductive agent may include acetylene black, carbon black, graphite, or mixtures thereof. Examples of the binder include polytetrafluoroethylene (PTFE), polyvinylidene fluoride (PVdF), fluorocarbon rubber, styrene butadiene rubber, and mixtures thereof. The binder has a function of binding the active material and the electro-conductive agent.

In the positive electrode active material-containing layer, the contents of the active material, the electro-conductive agent, and the binder are preferably 80% by mass to 97% by mass, 2% by mass to 18% by mass, and 1% by mass to 17% by mass, respectively. In the negative electrode active material-containing layer, the contents of the negative electrode active material, the electro-conductive agent, and the binder are preferably 70% by mass to 98% by mass, 1% by mass to 28% by mass, and 1% by mass to 28% by mass.

The thicknesses of each of the first and second active material-containing layers may be 5 µm to 100 µm.

The first and second current collectors may be electro-conductive sheets. An example of the electro-conductive sheet includes a foil made of an electro-conductive material. Examples of the electro-conductive material include aluminum and an aluminum alloy.

The thickness of each of the first and second current collectors may be to 5 µm to 40 µm.

The first and second current collector tabs may be made of the same material as the current collector, but a current collector tab may be prepared separately from the current collector, and this may be connected to at least one end surface of the current collector by welding or the like.

First Film

Each of the first films has a front surface and a back surface and includes an inorganic material. One principal surface of the first film corresponds to the front surface, and the other principal surface thereof corresponds to the back surface. Herein, the front surface of the first film may be referred to as a first film front surface. The back surface of the first film may be referred to as a first film back surface, similarly. Examples of the inorganic material may include oxides (for example, oxides of group IIA to VA elements, transition metals, IIIB elements, IVB elements, such as $Li_2O$, $BeO$, $B_2O_3$, $Na_2O$, $MgO$, $Al_2O_3$, $SiO_2$, $P_2O_5$, $CaO$, $Cr_2O_3$, $Fe_2O_3$, $ZnO$, $ZrO_2$, $TiO_2$, magnesium oxide, silicon oxide, alumina, zirconia, and titanium oxide), zeolites ($M_{2/n}O.Al_2O_3.xSiO_2.yH_2O$ (in the formula, M is a metal atom such as Na, K, Ca, and Ba, n is a number corresponding to the charge of a metal cation $M^+$, and x and y are the number of moles of $SiO_2$ and $H_2O$, where $2 \leq x \leq 10$, $2 \leq y$), nitrides (for example, BN, AlN, $Si_3N_4$, $Ba_3N_2$, or the like), silicon carbide (SiC), zircon ($ZrSiO_4$), carbonates (for example, $MgCO_3$, $CaCO_3$, or the like), sulfates (for example, $CaSO_4$, $BaSO_4$, or the like), and composites thereof (for example, steatite ($MgO.SiO_2$), forsterite ($2MgO.SiO_2$), and cordierite ($2MgO.2Al_2O_3.5SiO_2$) which are one kind of porcelain), tungsten oxide, or mixtures thereof.

Examples of the other inorganic materials include barium titanate, calcium titanate, lead titanate, $\gamma$-$LiAlO_2$, $LiTiO_3$, a solid electrolyte, or mixtures thereof.

Examples of the solid electrolyte include a solid electrolyte having no or low lithium ion conductivity and a solid electrolyte having lithium ion conductivity. Examples of the oxide particle having no or low lithium ion conductivity include lithium aluminum oxide (for example, $LiAlO_2$, $Li_xAl_2O_3$ where $0 \leq x \leq 1$), lithium silicon oxide, and lithium zirconium oxide.

Examples of the solid electrolyte having lithium ion conductivity include an oxide solid electrolyte having a garnet structure. The oxide solid electrolyte having the garnet structure has an advantage in that reduction resistance is high and an electrochemical window is wide. Examples of the oxide solid electrolyte having the garnet structure include $La_{5+x}A_xLa_{3-x}M_2O_{12}$ (A is at least one selected from the group consisting of Ca, Sr, and Ba, M is Nb and/or Ta, and x is in the range of 0.5 or less (including 0), preferably), $Li_3M_{2-x}L_2O_{12}$ (M is Nb and/or Ta, L includes Zr, x is in the range of 0.5 or less (including 0), preferably), $Li_{7-3x}Al_xLa_3Zr_3O_{12}$ (x is preferably in the range of 0.5 or less (including 0)), and $Li_7La_3Zr_2O_{12}$. Among them, $Li_{6.25}Al_{0.25}La_3Zr_3O_{12}$, $Li_{6.4}La_3Zr_{1.4}Ta_{0.6}O_{12}$, $Li_{6.4}La_3Zr_{1.6}Ta_{0.6}O_{12}$, and $Li_7La_3Zr_2O_{12}$ have high ionic conductivity and are electrochemically stable, and therefore have excellent discharge performance and cycle life performance.

Examples of the solid electrolyte having lithium ion conductivity include a lithium phosphate solid electrolyte having a NASICON structure, also. Examples of the lithium phosphate solid electrolyte having the NASICON structure include $LiMl_2(PO_4)_3$, where Ml includes one or more elements selected from the group consisting of Ti, Ge, Sr, Zr, Sn, and Al. Preferred examples include $Li_{1+x}Al_xGe_{2-x}(PO_4)_3$, $Li_{1+x}Al_xZr_{2-x}(PO_4)_3$ and $Li_{1+x}Al_xTi_{2-x}(PO_4)_3$. Here, x is preferably in the range of 0 to 0.5. In addition, each of the exemplified solid electrolytes has high ionic conductivity and high electrochemical stability. Both the lithium phosphate solid electrolyte having the NASICON structure and the oxide solid electrolyte having the garnet structure may be used as the solid electrolyte having lithium ion conductivity.

The first film containing at least one inorganic material selected from the above may be a porous film made of agglomerates of inorganic material particles. Like the solid electrolyte, for example, although there exist inorganic materials having lithium ion conductivity, many inorganic materials have low electron conductivity or have insulating properties. Therefore, the first film can function as a partition which separates the positive electrode from the negative electrode. As a result, since the electric conduction can be suppressed between the first active material-containing layer and the second active material-containing layer facing the first active material-containing layer through the first film, internal short circuit and self-discharge can be suppressed.

In addition, since the first film can hold the nonaqueous electrolyte in the porous portion, the first film does not inhibit the permeation of Li ions.

The first film containing the inorganic material of the above species has high insulating properties while having Li ion permeability. Considering practical aspects and the like, the first film containing alumina is preferable.

The form of the inorganic material may be, for example, granular, fibrous, or the like.

The average particle size D50 of the inorganic material particles may be 0.5 µm to 2 µm.

The content of the inorganic material in the first film is preferably in the range of 80% by mass to 99.9% by mass. Thereby, the insulating property of the first film can be increased.

The first film may include a binder. Examples of the binder include polytetrafluoroethylene (PTFE), polyvinylidene fluoride (PVdF), fluorocarbon rubber, styrene butadiene rubber, and mixtures thereof. The content of the binder in the first film is preferably in the range of 0.01% by mass to 20% by mass.

The thickness of the first film may be 1 µm to 30 µm. Note, that the thickness of the first film may be referred to as a first film thickness, herein.

Second Film

The second film contains an organic fiber. The second film may be a porous film in which organic fibers are deposited in a plane direction. The second film has a front surface and a back surface. One principal surface of the second film corresponds to the front surface, and the other principal surface thereof corresponds to the back surface. Herein, the front surface of the second film may be referred to as a second film front surface. The back surface of the second film may be referred to as a second film back surface, similarly.

The organic fiber includes, for example, at least one organic material selected from the group consisting of polyamide imide, polyamide, polyolefin, polyether, polyimide, polyketone, polysulfone, cellulose, polyvinyl alcohol (PVA), and polyvinylidene fluoride (PVdF). Examples of the polyolefin include polypropylene (PP) and polyethylene (PE). The organic fiber may be of one species or of two or more species. Preferable examples include at least one selected from the group consisting of polyimide, polyamide, polyamideimide, cellulose, PVdF, and PVA, and more preferable examples include at least one selected from the group consisting of polyimide, polyamide, polyamideimide, cellulose, and PVdF.

Since polyimide is insoluble and infusible even at 250° C. to 400° C. and does not decompose, a second film having excellent heat resistance can be obtained.

The organic fiber preferably has a length of 1 mm or more, an average diameter of 2 µm or less, and more preferably an average diameter of 1 µm or less. Since such a second film has sufficient strength, porosity, air permeability, pore size, resistance to electrolysis, resistance to oxidation reduction, or the like, the second film functions well as a separator. The average diameter of the organic fibers can be measured by observation with a focused ion beam (FIB) apparatus. In addition, the length of the organic fiber is obtained based on the length measurement in observation with the FIB apparatus.

From the viewpoint of securing ion permeability and electrolyte retention, 30% or more of the volume of the entire fibers forming the second film is preferably an organic fiber having an average diameter of 1 µm or less, more preferably an organic fiber having an average diameter of 350 nm or less, further preferably an organic fiber having an average diameter of 50 nm or less.

In addition, the volume of the organic fiber having an average diameter of 1 µm or less (more preferably 350 nm or less, and further preferably 50 nm or less) preferably occupies 80% or more of the volume of the entire fiber forming the second film. Such a state can be examined by scanning ion microscope (SIM) observation of the second film. More preferably, the organic fiber having a thickness of 40 nm or less occupies 40% or more of the volume of the entire fiber forming the second film. The diameter of the organic fiber being small means that the influence of interfering with the movement of ions is small.

A cation exchange group is preferably present on at least a part of the entire surface including the front surface and the back surface of the layer of organic fiber (i.e., the second film). The movement of ions such as lithium ions passing through the separator is promoted by the cation exchange group, thereby improving the performance of the battery. Specifically, rapid charge and rapid discharge can be performed for a long period of time. The cation exchange group is not particularly limited, but examples thereof include a sulfonate group and a carboxylate group. Fibers having the cation exchange group on the surface thereof can be formed by, for example, an electrospinning method using a sulfonated organic material.

The second film has vacancies, and the average pore size of the pores is 5 nm to 10 µm, preferably. In addition, the porosity is preferably 70% to 90%. If such vacancies are provided, a separator having excellent ion permeability and excellent electrolyte impregnating property can be obtained. The porosity is more preferably 80% or more. The average pore size and porosity of the vacancies can be examined by a mercury intrusion method, calculation from volume and density, SEM observation, SIM observation, or a gas absorption method. The porosity is preferably calculated from the volume and density of the second film. In addition, it is preferable to measure the average pore size by a mercury intrusion method or a gas adsorption method. The high porosity of the second film means that the influence of interfering ion migration is small.

The thickness of the second film is preferably within the range of 12 µm or less. The lower limit of the thickness is not particularly limited, but may be 1 µm. Note, that the thickness of the second film may be referred to as a second film thickness, herein.

In the second film, if the contained organic fibers are made sparse, the porosity is increased, and thus it is not difficult to obtain a layer having, for example, a porosity of about 90%. It is extremely difficult to form such a layer having a large porosity using particles.

The second film is advantageous over inorganic fiber deposits in terms of irregularities, cracking tendency, electrolyte holding, adhesion, bending properties, porosity, and ion permeability.

The second film may contain particles of an organic compound. The particles are made of, for example, the same material as the organic fiber. The particles may be integrally formed with the organic fibers.

The second film may be formed on the second active material-containing layer, but the second film may be formed on the first film. Alternatively, the second film may be formed on both, the surfaces of the second active material-containing layer and the first film. In either case, one of the front surface and the back surface of the second film is in contact with the front surface of the first film.

The thicknesses of the first film and the second film are measured by a method in accordance with the JIS standard (JIS B 7503-1997). Specifically, these thicknesses are measured by using a contact digital gauge. The material is put on a stone plate and the digital gauge fixed to the stone plate is used. Using a flat-shaped measuring terminal with a tip of 5.0 mm diameter, the measurement terminal is brought towards the sample from a distance 1.5 mm or more and less than 5.0 mm above the sample, and the distance at which the measurement terminal comes into contact with the sample is the thickness of the sample.

The second film may be formed by, for example, an electrospinning method. In the electrospinning method, a first electrode or a second electrode, which is a target for forming a second film onto, is grounded to be an earth electrode (ground electrode). In the case of forming onto the first electrode, a first electrode on which the first film has already been formed is prepared.

Figure 16:
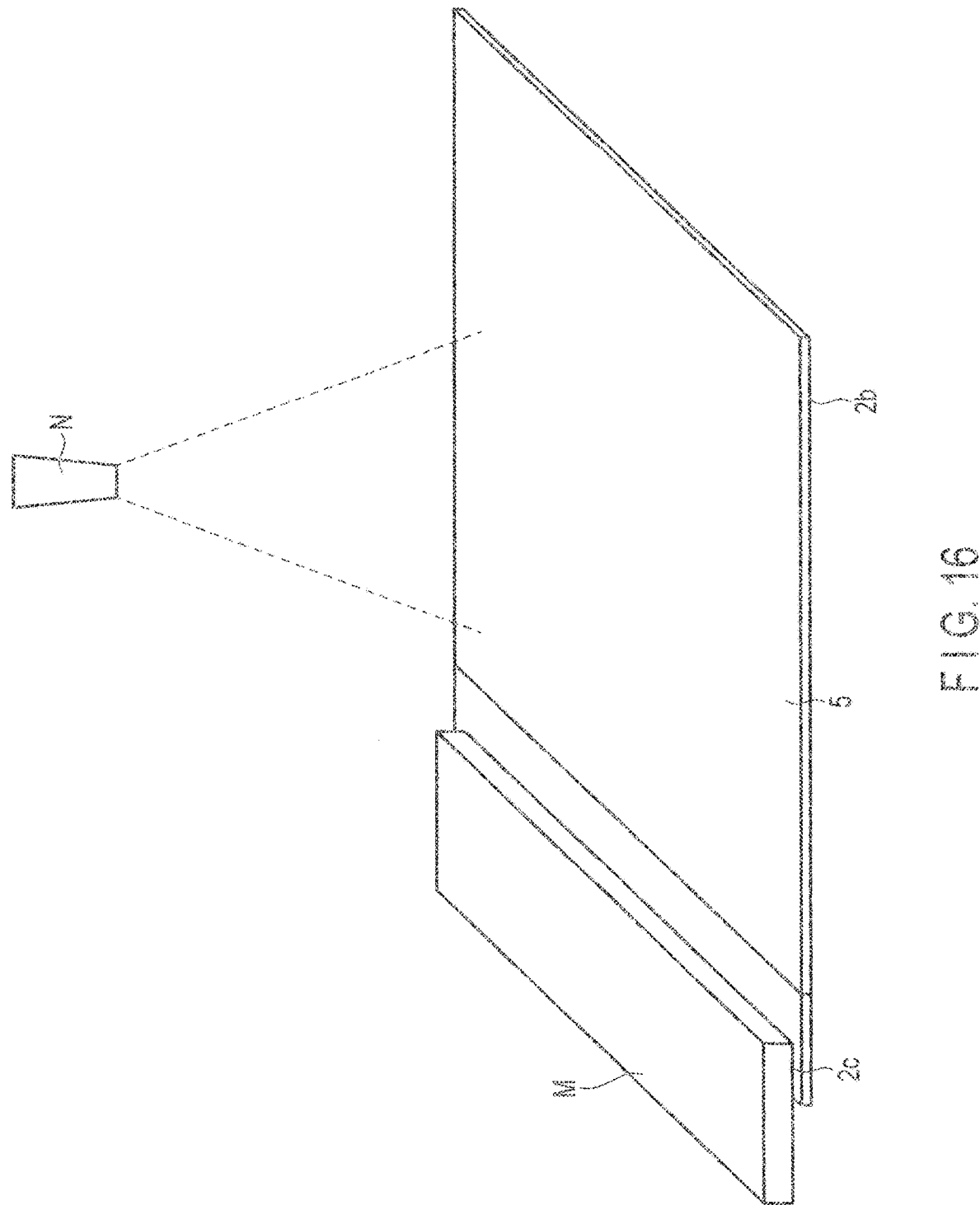
FIG. 16 is a schematic view of one step in a method of manufacturing a laminate according to an embodiment.

A liquid raw material (for example, a raw material solution) is charged by a voltage applied to a spinning nozzle, and a charge amount per unit volume of the raw material solution is increased by volatilization of a solvent from the raw material solution. Continuous occurrence of volatilization of the solvent and an increase in the charge amount per unit volume in accompany of the volatilization causes the raw material solution discharged from the spinning nozzle to extend in the longitudinal direction and to be deposited as a nano-sized organic fiber on the first electrode or the second electrode which is the earth electrode. A Coulomb force is generated between the organic fiber and the earth electrode by the potential difference between the nozzle and the earth electrode. Therefore, since the contact area with the first film can be increased by the nano-sized organic fiber, and the organic fiber can be deposited onto the first electrode or the second electrode by the Coulomb force, it is possible to increase the peel strength from the electrode of the second film. The peel strength can be controlled by, for example, adjusting the solution concentration, the sample-nozzle distance, and the like. In a case where the second film is not formed on the first and second current collector tabs, it is preferable to form the second film after masking the first and second current collector tabs. Such an example is illustrated in FIG. 16. FIG. 16 is a perspective view illustrating a step of forming the second film on the second electrode. As illustrated in FIG. 16, the second film 5 is directly formed by the raw material solution discharged from the nozzle N being deposited as organic fibers onto the second active material-containing layer 2b and the second current collector tab 2c. One side at an end of the second current collector tab 2c and the vicinity thereof are covered with a mask M. Therefore, the second film 5 becomes a porous film containing organic fibers that are deposited overlapping the front surface of the second active material-containing layer 2b and the portion of the front surface of the second current collector tab 2c adjacent to the second active material-containing layer 2b.

The second film can be easily formed on the electrode surface by using the electrospinning method. In principle, since the electrospinning method forms a single continuous fiber, it is possible to ensure tolerance to breakage due to bending and film cracking, even with a thin film. That the organic fiber constituting the second film is continuous without seams means a low probability of fraying and partial defects of the second film, and is advantageous in suppressing self-discharge.

For the liquid raw material used for electrospinning, for example, a raw material solution prepared by dissolving an organic material in a solvent is used. Examples of the organic material may be the same as those mentioned for the organic material constituting the organic fiber. The organic material is used by being dissolved in a solvent at a concentration of, for example, about 5% by mass to 60% by mass. The solvent for dissolving the organic material is not particularly limited, and there may be used any solvent such as dimethyl acetamide (DMAc), dimethyl sulfoxide (DMSO), N,N'-dimethylformamide (DMF), N-methylpyrrolidone (NMP), water, alcohols, and the like. In addition, regarding organic materials having low solubility, electrospinning is performed while melting a sheet-shaped organic material with a laser or the like. In addition, it is also permissible to mix a high boiling point organic solvent and a low melting point solvent.

The second film is formed by applying a voltage to the spinning nozzle by using a high voltage generator and discharging the raw material from the spinning nozzle over the front surface of the predetermined electrode. The applied voltage is appropriately determined according to solvent/solute species, boiling point/vapor pressure curves of the solvent, solution concentration, temperature, nozzle shape, distance between the sample and the nozzle, and for example, the potential difference between the nozzle and the workpiece may be 0.1 kV to 100 kV. The supply rate of the raw material is appropriately determined according to a solution concentration, a solution viscosity, a temperature, a pressure, an applied voltage, a nozzle shape, and the like. In the case of a syringe type, for example, the supply rate may be about 0.1 µl/min to 500 µl/min per nozzle. In addition, in the case of multiple nozzles or slits, the supply speed may be determined according to the opening area.

Since the organic fiber is directly formed onto the front surface of the electrode in a dry state, it is substantially avoidable that the solvent contained in the raw material penetrates into the electrode. The amount of the residual solvent in the electrode is as extremely low as ppm level or less. The residual solvent in the electrode causes an oxidation-reduction reaction, causing loss in the battery and leading to a decrease in battery performance. According to the present embodiment, since the possibility of occurrence of such inconvenience is reduced as much as possible, the performance of the battery can be enhanced.

A method of manufacturing the laminate of the embodiment will be described below.

<First Manufacturing Method>

Figure 17:
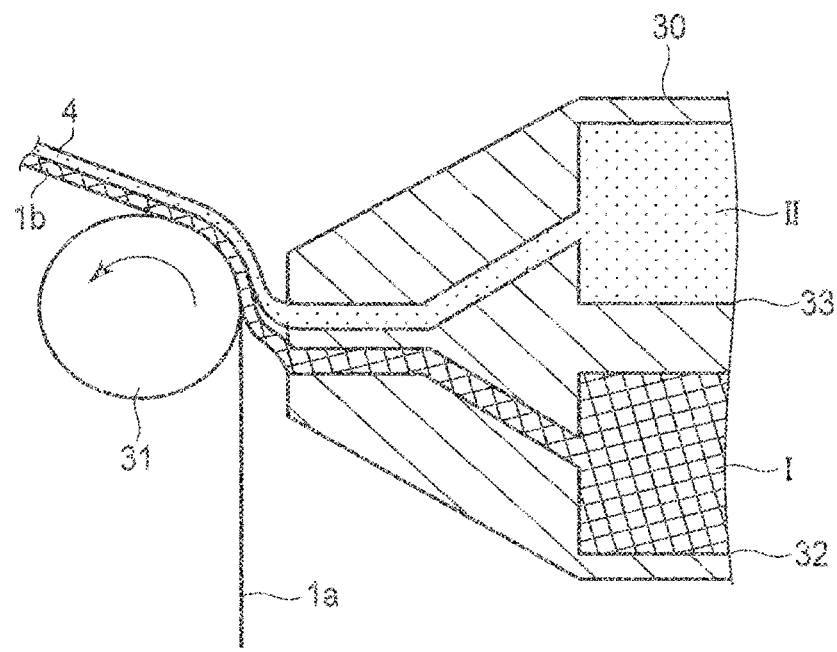
FIG. 17 is a schematic view of one step in a method of manufacturing a laminate according to the embodiment.
Figure 23:
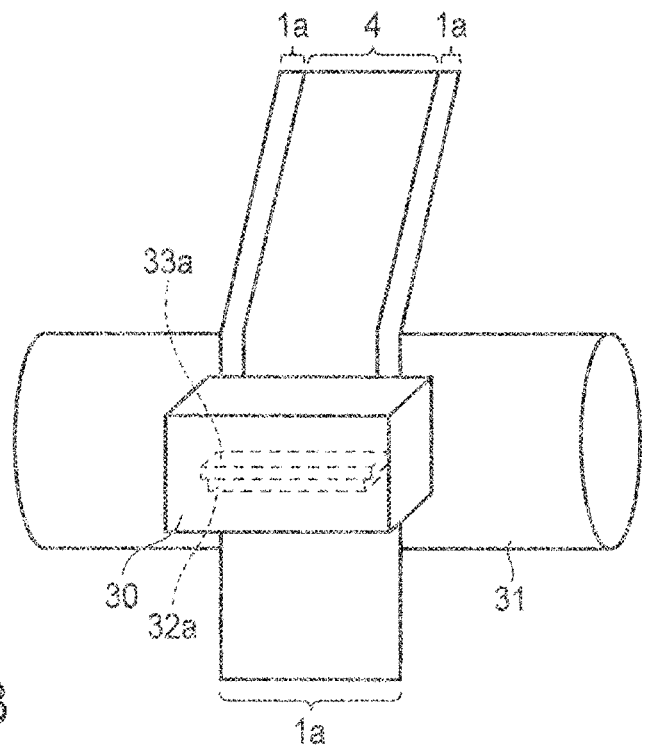
FIG. 23 is a schematic view of one step in a method of manufacturing a laminate of an embodiment.

A slurry containing a first active material (hereinafter, referred to as slurry I) and a slurry containing an inorganic material (hereinafter, referred to as slurry II) are simultaneously applied to at least one of a front surface and a back surface of a first current collector. An example of a coating process is illustrated in FIGS. 17 and 23. A coating apparatus 30 includes a tank 32 for containing the slurry I and a tank 33 for containing the slurry II, and is configured to simultaneously coat the slurry I and the slurry II to a substrate. A width of the slurry I orthogonal to a coating direction at a discharge port corresponds to a coating width of an active material-containing layer. In addition, the width of the slurry II orthogonal to the coating direction at the discharge port corresponds to the coating width of the first film. A first current collector 1a in a long shape before being cut to a predetermined size is conveyed to a slurry discharge port of the coating apparatus 30 by a conveying roller 31. In FIG. 23, a slurry I discharge port 32a is located on the upstream side of the current collector with respect to a slurry II discharge port 33a. The width of the slurry I discharge port 32a orthogonal to the coating direction is narrower than the width of the slurry II discharge port 33a orthogonal to the coating direction. The slurry I is coated onto the first current collector 1a from the coating apparatus 30, except for both end portions in the short side direction. At substantially the same time, the slurry II is coated over the slurry I in such a manner that the slurry II becomes coated beyond the coating area of the slurry I. Since the slurry II is coated over the slurry I before the slurry I is dried, the slurry II is more likely to follow the surface shape of the slurry I. After that, after drying the slurry, roll pressing is applied to the dried laminate object, and the object is cut to a predetermined size to obtain a first electrode.

Figure 24:
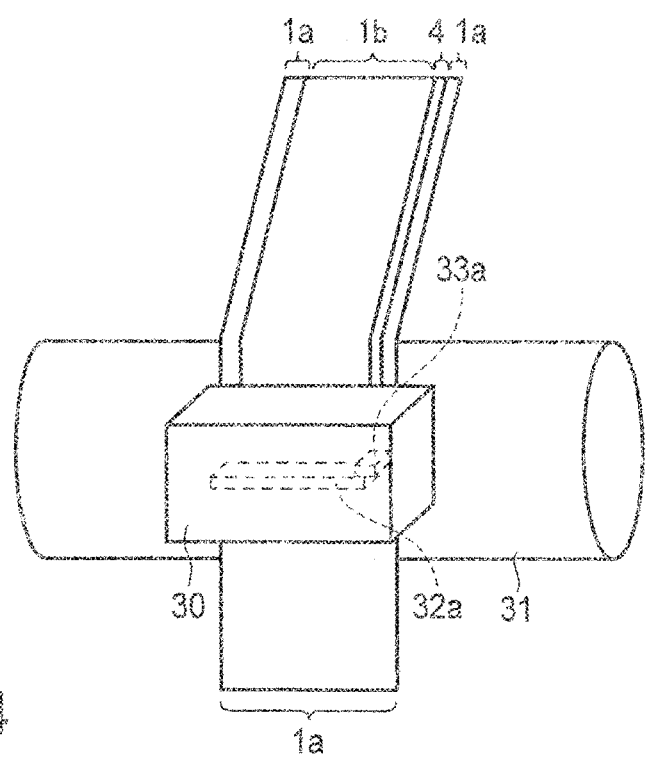
FIG. 24 is a schematic view of one step in a method of manufacturing a laminate of an embodiment.

By changing the arrangement of the slurry II discharge port 33a, only the first end surface of the first active material-containing layer and the portion of the front surface of the first current collector tab adjacent to the first end surface can be coated with the first film. Such an example is illustrated in FIG. 24. As illustrated in FIG. 24, the slurry II discharge port 33a is arranged on one end portion of the slurry I discharge port 32a in a direction orthogonal to the coating direction. The slurry I is coated onto the first current collector 1a from the coating apparatus 30, except for both end portions in the short side direction. At substantially the same time, the slurry II is coated over the coating region 1b of the slurry I at one side in the coating direction and over the front surface of the first current collector 1a adjacent thereto. Since the slurry II is coated over the slurry I before the slurry I is dried, the slurry II follows the coating region 1b of the slurry I as the coating region 1b diffuses on the first current collector 1a, and the end portion including the first end surface having the structures illustrated in FIGS. 3 to 10 is obtained. After that, after drying the slurry, roll pressing is applied to the dried laminate object, and the object is cut to a predetermined size to obtain a first electrode.

The viscosity of the slurry II is preferably larger than the viscosity of the slurry I. Thereby, since the fluidity of the slurry II is lower than that of the slurry I, after the slurry I diffuses on the front surface of the first current collector and the thickness of the end portion of the coating becomes thin, the slurry II diffuses over the slurry I while following the shape of the slurry I, there. As a result, the thickness defined at the first end surface of the first active material-containing layer can be made smaller than the thickness defined at the second end surface of the first active material-containing layer. The viscosity of the slurry II is preferably higher than the viscosity of the slurry I over a range where a viscosity shear rate is 1.0 (1/s) to 1,000 (1/s). The viscosity of the slurry I is preferably 0.01 Pa·s to 1,000 Pa·s, and more preferably 0.1 Pa·s to 100 Pa·s, in a region having a viscosity shear rate of 1.0 (1/s) to 1,000 (1/s). On the other hand, the viscosity of the slurry II is preferably 0.1 Pa·s to 1,000 Pa·s, and more preferably 1 Pa·s to 1,000 Pa·s, in the range of viscosity shear rate of 1.0 (1/s) to 1,000 (1/s).

On the other hand, after a slurry containing the second active material is coated onto the second current collector, the slurry is dried, the dried laminate object is subjected to roll pressing, and the dried laminate object is cut to a predetermined size to obtain a second electrode. The second film is formed on the second electrode by an electrospinning method. Pressing may be performed, subsequently. As the pressing method, roll pressing or flat plate pressing may be used.

The first electrode and the second electrode are stacked so as to face each other with the first film and the second film interposed therebetween to obtain a laminate of an embodiment.

<Second Manufacturing Method>

On the first electrode manufactured by the first manufacturing method, a second film is formed by an electrospinning method. Pressing may be performed, subsequently.

On the other hand, after the slurry containing the second active material is coated onto the second current collector, the slurry is dried, the dried laminate object is subjected to roll pressing, and the object is cut to a predetermined size to obtain a second electrode.

The first electrode and the second electrode are stacked so as to face each other with the first film and the second film interposed therebetween to obtain a laminate of an embodiment.

The laminate obtained by the first or second manufacturing method may be used as an electrode group as is, a stack of plural laminates may be used as an electrode group, and one set or plural laminates wound in a spiral shape may be used as the electrode group. It is to be noted that the electrode group may be pressed.

According to the above-described laminate according to the first embodiment, the first film containing the inorganic material covers at least the first end surface of the first active material-containing layer and the portion of the front and back surfaces of the first current collector tab adjacent to the first end surface. In addition, the thickness defined at the first end surface of the first active material-containing layer is smaller than the thickness defined at the second end surface of the first active material-containing layer facing in a direction opposite to the first end surface. As a result, since peeling of the first film from the first active material-containing layer can be suppressed, it is possible to eliminate an internal short circuit which is a factor hindering the increase in capacity.

Second Embodiment

A secondary battery according to a second embodiment includes the laminate of the first embodiment. The secondary battery may further include an electrolyte and a container member capable of housing the electrolyte and the laminate.

A stack obtained by stacking plural laminates so that a first film or a second film is located between a first active material-containing layer and a second active material-containing layer may be used for a secondary battery as an electrode group. The shape of the electrode group is not limited to this shape, and one or more laminates wound in a spiral or a flat spiral shape may be used as the electrode group.

The secondary battery may further include a first electrode terminal electrically connected to the first current collector tab and a second electrode terminal electrically connected to the second current collector tab.

As the electrolyte, for example, a nonaqueous electrolyte is used. Examples of the nonaqueous electrolyte include a liquid nonaqueous electrolyte prepared by dissolving an electrolyte in an organic solvent, a gel nonaqueous electrolyte in which a liquid electrolyte and a polymer material are combined, and the like. The liquid nonaqueous electrolyte can be prepared by, for example, dissolving an electrolyte in an organic solvent at a concentration of 0.5 mol/L to 2.5 mol/L.

Examples of the electrolyte include a lithium salt such as lithium perchlorate (LiClO$_4$), lithium hexafluorophosphate (LiPF$_6$), lithium tetrafluoroborate (LiBF$_4$), lithium arsenic hexafluoride (LiAsF$_6$), lithium trifluoromethanesulfonate (LiCF$_3$SO$_3$), or bistrifluoromethylsulfonylimide lithium [LiN(CF$_3$SO$_2$)$_2$], and mixtures thereof. Those difficult to be oxidized even at a high potential are preferable, and LiPF$_6$ is most preferable.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2MeTHF), or dioxolane (DOX); linear ethers such as dimethoxyethane (DME) or diethoxyethane (DEE); γ-butyrolactone (GBL); acetonitrile (AN); and sulfolane (SL). These organic solvents may be used alone or as a mixture of two or more.

Examples of the polymer material include polyvinylidene fluoride (PVdF), polyacrylonitrile (PAN), and polyethylene oxide (PEO).

As the nonaqueous electrolyte, an ambient-temperature molten salt (ionic melt) containing lithium ions, a polymer solid electrolyte, an inorganic solid electrolyte, or the like may be used.

As the container member, for example, a metal container, a container made of a laminated film, or the like may be used.

The form of the secondary battery is not particularly limited, and may be various forms such as a cylindrical shape, a flat shape, a thin shape, a square shape, a coin shape, and the like.

Figure 18:
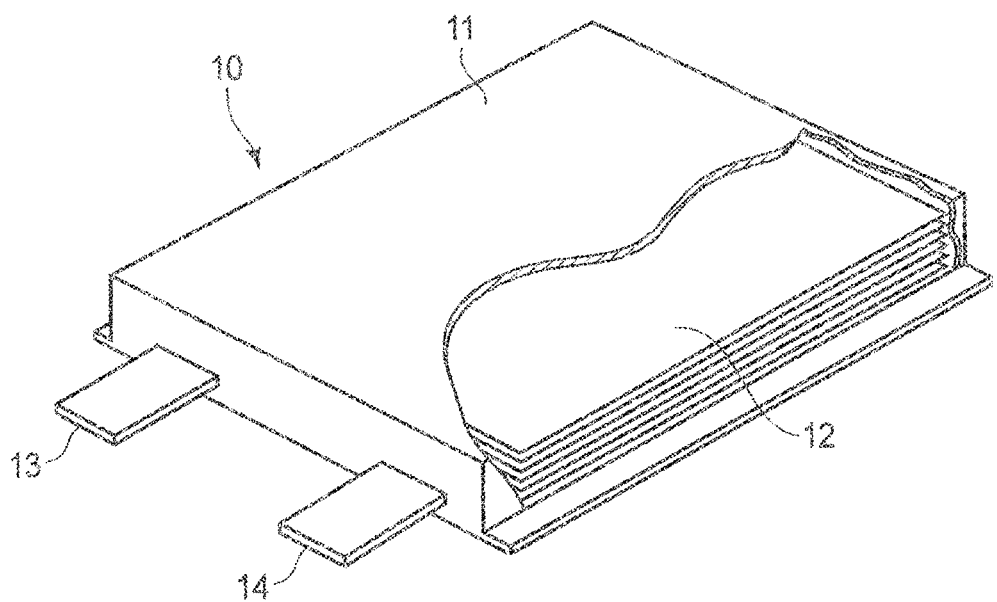
FIG. 18 is a partial cutaway perspective view illustrating an example of a secondary battery according to an embodiment.

FIG. 18 is a partial cutaway perspective view illustrating an example of a secondary battery according to the embodiment. FIG. 18 is a view illustrating an example of a secondary battery using a laminated film as a container member. The secondary battery 10 illustrated in FIG. 18 includes a container member 11 made of a laminated film, an electrode group 12, a first electrode terminal 13, a second electrode terminal 14, and a nonaqueous electrolyte (not illustrated). The electrode group 12 includes plural laminates according to the above-described embodiment and has a structure in which a first electrode and a second electrode are stacked with separator(s) interposed therebetween. The nonaqueous electrolyte (not illustrated) is held or impregnated in the electrode group 12. A first current collector tab of the first electrode is electrically connected to the first electrode terminal 13. A second current collector tab of the second electrode is electrically connected to the second electrode terminal 14. As illustrated in FIG. 18, the tips of the first electrode terminal 13 and the second electrode terminal 14 protrude outside from one side of the container member 11, parted at a distance from each other.

Figure 19:
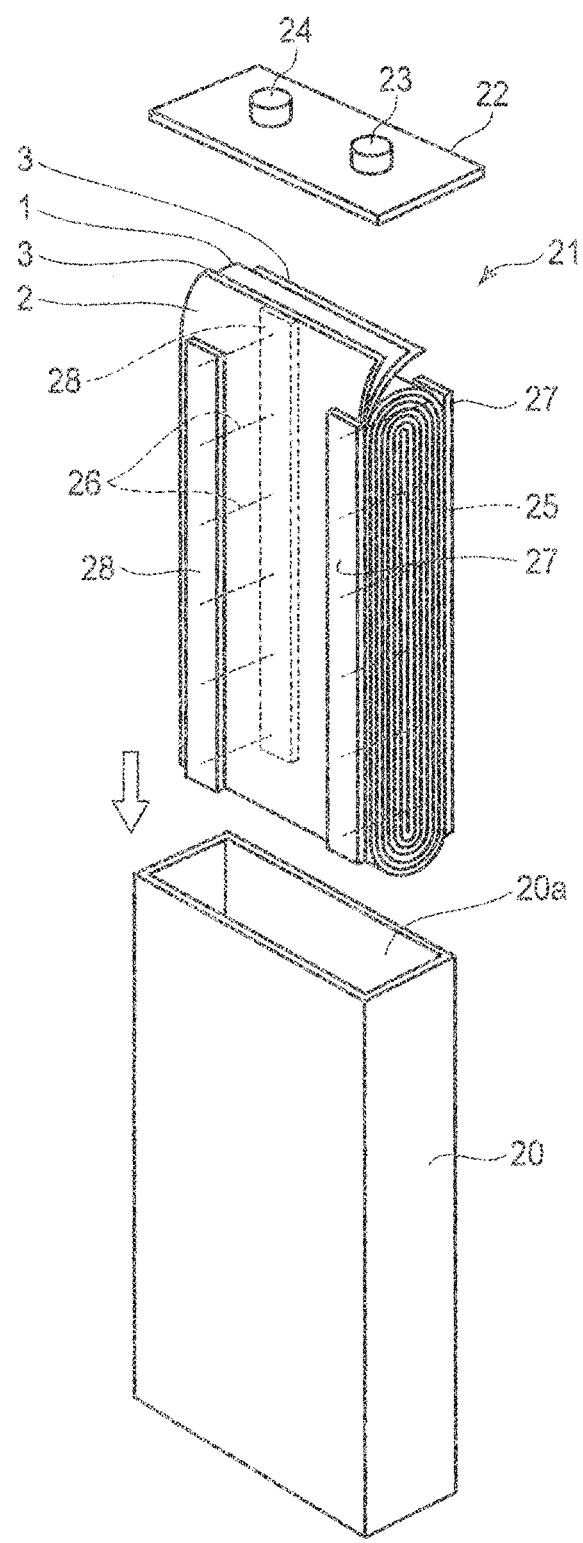
FIG. 19 is an exploded view of another example of a secondary battery according to the embodiment.

FIG. 19 is an exploded perspective view illustrating another example of a secondary battery according to the embodiment. FIG. 19 is a view illustrating an example of a secondary battery using a rectangular metal container as a container member. The secondary battery illustrated in FIG. 19 includes a container member 20, a wound electrode group 21, a lid 22, a first electrode terminal 23, a second electrode terminal 24, and a nonaqueous electrolyte (not illustrated). The wound electrode group 21 has a structure in which the laminate according to the above-described embodiment is wound in a flat spiral shape. In the wound electrode group 21, a first current collector tab 25 wound in a flat spiral shape is located at one surface in a winding axis direction, and a second current collector tab 26 wound in a flattened spiral shape is located at another end surface in the winding axis direction. The nonaqueous electrolyte (not illustrated) is held or impregnated in the electrode group 21. A first electrode lead 27 is electrically connected to the first current collector tab 25 and also electrically connected to the first electrode terminal 23. In addition, a second electrode lead 28 is electrically connected to the second current collector tab 26 and also electrically connected to the second electrode terminal 24. The electrode group 21 is disposed in the container member 20 so that the first electrode lead 27 and the second electrode lead 28 face the principal surface side of the container member 20. The lid 22 is fixed to an opening 20$a$ of the container member 20 by welding or the like. The first electrode terminal 23 and the second electrode terminal 24 are respectively attached to the lid 22 through an insulating hermetic seal member (not illustrated).

According to the above-described secondary battery according to the second embodiment, since the laminate according to the first embodiment is included, it is possible to provide the secondary battery having excellent capacity and life performance by eliminating an internal short circuit which hinders high capacity.

EXAMPLES

Secondary batteries having a first electrode as a positive electrode and a second electrode as a negative electrode were produced by the following method.

Example 1

A positive electrode, an insulating inorganic material layer serving as a first film on the positive electrode, a negative electrode, and a nanofiber layer serving as a second film on the negative electrode were produced by the following method.

LiNi$_{0.33}$Co$_{0.33}$Mn$_{0.33}$O$_2$ particles serving as a positive electrode active material, carbon black serving as an electroconductive agent, and polyvinylidene fluoride (PVdF) serving as a binder were prepared. These were mixed at a mass ratio of 90:5:5 to obtain a mixture. Next, the obtained mixture was dispersed in an n-methylpyrrolidone (NMP) solvent to prepare a positive electrode slurry having a viscosity of 10 Pa·s at a viscosity shear rate of 1.0 (1/s) and 0.5 Pa·s at a viscosity shear rate of 1,000 (1/s).

Al$_2$O$_3$ particles having an average particle size of 1 μm as the insulating inorganic material and PVdF were prepared. These were mixed at a mass ratio of 100:4 to obtain a mixture. Next, the obtained mixture was dispersed in NMP to prepare an alumina-containing slurry having a viscosity of 100 Pa·s at a viscosity shear rate of 1.0 (1/s) and 2 Pa·s at a viscosity shear rate of 1,000 (1/s).

Therefore, the viscosity of the alumina-containing slurry (slurry II) is larger than the viscosity of the positive electrode slurry (slurry I) over a range of viscosity shear rate at 1.0 (1/s) to 1,000 (1/s).

The viscosities of the positive electrode slurry and the alumina-containing slurry were measured by using a Thermo Scientific HAAKE MARS III viscosity/viscoelasticity measuring device.

Next, on an aluminum foil having a thickness of 15 μm, the positive electrode slurry was coated in the lower layer, the alumina-containing slurry was coated in the upper layer, in such a manner that the alumina-containing slurry of the upper layer was coated over and beyond the lower layer, and drying was performed. This was performed on both faces of the aluminum foil. After that, roll pressing was performed, and by cutting to a predetermined size, a positive electrode was obtained. The insulating inorganic material layer covered the front surface and the first end surface of the positive electrode active material-containing layer, and the portion adjacent to the first end surface among the front and back surfaces of the positive electrode tab, as illustrated in FIG. 2.

Figure 20:
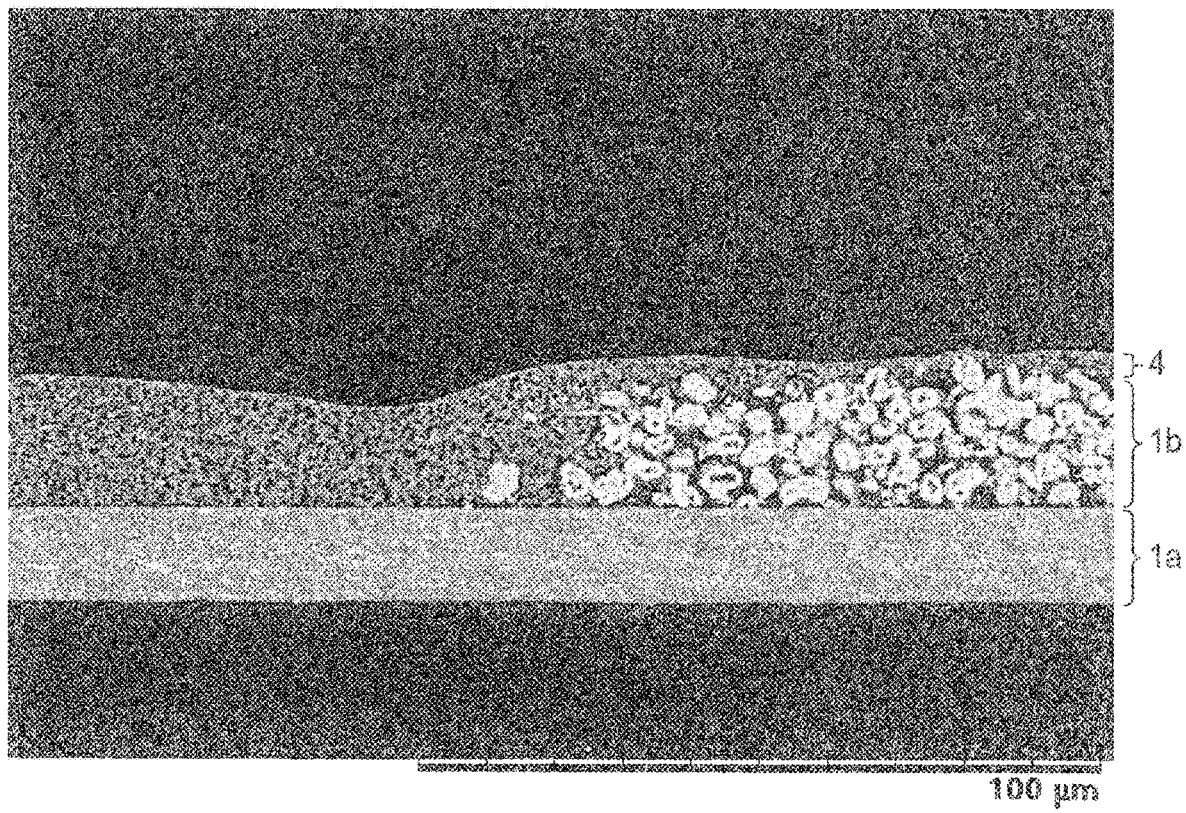
FIG. 20 is a cross-sectional scanning electron microscope (SEM) photograph of an end portion including a first end surface of a positive electrode active material-containing layer in Example 1.

The thickness of each of the positive electrode active material-containing layers was 20 µm, the thickness of the insulating inorganic material layer on the positive electrode active material-containing layer was 3 µm, and the thickness of the insulating inorganic material layer formed on the aluminum foil past the positive electrode active material-containing layer was 20 µm. The thickness T1 of the first end surface was 5 µm and the thickness T2 of the second end surface was 20 µm. The shape of the end portion including the first end surface was as illustrated in FIG. 3. FIG. 20 illustrates a scanning electron microscope (SEM) photograph of a cross-section of the vicinity of the end portion including the first end surface, cut along the first direction which is an extending direction of a current collector tab. As illustrated in FIG. 20, the thickness of the positive electrode active material-containing layer 1b containing a large number of particles becomes thinner toward the current collector tab side. The first film 4 covers the front surfaces of the positive electrode active material-containing layer 1b and the positive electrode current collector 1a. The thickness of the first film 4 is thicker at the portion in contact with the front surface of the positive electrode current collector 1a than at the portion in contact with the front surface of the positive electrode active material-containing layer 1b. Namely, a first film portion thickness of a first portion of the first film 4, which is in contact with the front surface of the positive electrode current collector 1a, is thicker than a second portion thickness of a second portion of the first film 4, which is in contact with the first layer front surface of the positive electrode active material-containing layer 1b.

It is to be noted that a portion not supporting the positive electrode active material-containing layer was provided on one long side of the current collector, and this portion was used as the positive electrode current collecting tab.

Lithium titanate particles having an average primary particle size of 0.5 µm and serving as a negative electrode active material, carbon black serving as an electro-conductive agent, and polyvinylidene fluoride serving as a binder were prepared. These were mixed at a mass ratio of 90:5:5 to obtain a mixture. The obtained mixture was dispersed in an n-methylpyrrolidone (NMP) solvent to prepare a slurry.

The obtained slurry was coated onto both surfaces of an aluminum foil having a thickness of 15 µm and was then dried. Next, the dried coating film was pressed to obtain a negative electrode. The thickness of each of the negative electrode active material-containing layers was 30 µm. It is to be noted that a portion not supporting the negative electrode active material-containing layer was provided on one long side of the current collector, and this portion was used as the negative electrode current collecting tab.

Organic fibers were deposited on the negative electrode by an electrospinning method to form a nanofiber layer. As the organic material, polyimide was used. The polyimide was dissolved in DMAc serving as a solvent at a concentration of 20% by mass to prepare a raw material solution as a liquid raw material. The obtained raw material solution was fed to the front surface of the negative electrode from a spinning nozzle at a feed rate of 5 µl/min by using a metering pump. A high voltage generator was used to apply a voltage of 20 kV to the spinning nozzle, and a layer of organic fiber of 2 µm was formed on the front surface of the negative electrode active material-containing layer, using one spinning nozzle and moving the nozzle over a span of 100 mm×200 mm. It is to be noted that a negative electrode was obtained by performing an electrospinning method in a state in which the front surface of the negative electrode tab is masked, except for a portion on both surfaces (principal surfaces) of the negative electrode tab at the boundary with the negative electrode active material-containing layer to 10 mm away from the boundary. The organic fiber layer covers the front surface of each of the negative electrode active material-containing layers, four side surfaces orthogonal to the front surface, three end surfaces of the negative electrode current collector exposed to the negative electrode surface, a portion that is adjacent to the end surface of the negative electrode active material-containing layer in the front and back surfaces of the negative electrode tab, as illustrated in FIG. 11.

Example 2

A positive electrode, an insulating inorganic material layer on the positive electrode, a nanofiber layer on the inorganic material layer, and a negative electrode were produced by the following method.

A positive electrode having an insulating inorganic material layer formed thereon was produced in the same manner as in Example 1. The positive electrode was used as a substrate, and organic fibers were deposited onto the substrate by an electrospinning method to form a nanofiber layer. As the organic material, polyimide was used. The polyimide was dissolved in DMAc serving as a solvent at a concentration of 20% by mass to prepare a raw material solution as a liquid raw material. The obtained raw material solution was fed to the front surface of the positive electrode from a spinning nozzle at a feed rate of 5 µl/min by using a metering pump. A high voltage generator was used to apply a voltage of 20 kV to the spinning nozzle, and a layer organic fiber of 2 µm was formed on the substrate using one spinning nozzle and moving the nozzle over a span of 100 mm×200 mm. It is to be noted that a positive electrode was obtained by performing an electrospinning method in a state in which the front surface of the positive electrode tab is masked, except for a portion on both surfaces (principal surfaces) of the positive electrode tab at the boundary with the positive electrode active material-containing layer to 10 mm away from the boundary. The organic fiber layer covers the front surface of the insulating inorganic material layer and the front surface of the positive electrode not covered with the insulating inorganic material layer, that is, three electrode end surfaces where the positive electrode tab does not extend, as illustrated in FIG. 14.

Lithium titanate particles having an average primary particle size of 0.5 µm and serving as a negative electrode active material, carbon black serving as an electro-conductive agent, and polyvinylidene fluoride serving as a binder were prepared. These were mixed at a mass ratio of 90:5:5 to obtain a mixture. The obtained mixture was dispersed in an n-methylpyrrolidone (NMP) solvent to prepare a slurry.

The obtained slurry was coated onto both surfaces of an aluminum foil having a thickness of 15 µm and then dried. Next, the dried coating film was pressed to obtain a negative electrode. The thickness of each of the negative electrode active material-containing layers was 30 µm. It is to be noted that a portion not supporting the negative electrode active material-containing layer was provided on one long side of the current collector, and this portion was used as the negative electrode tab.

Example 3

A positive electrode, an insulating inorganic material layer serving as a first film on the positive electrode, a negative electrode, and a nanofiber layer serving as a second film on the negative electrode were produced by the following method.

A positive electrode slurry and an alumina-containing slurry were prepared in the same conditions as in Example 1.

Next, a coating apparatus illustrated in FIG. 24 was used. Onto the positive electrode current collector made of an aluminum foil having a thickness of 15 μm, while coating the positive electrode slurry except for both end portions in the short side direction, an alumina-containing slurry was coated over the long side of the coating region of the positive electrode slurry and over the front surface of the positive electrode current collector adjacent thereto. Next, after drying, roll pressing was performed, and a positive electrode was obtained by performing punching so that the portion of the positive electrode current collector in vicinity of the long side at the side coated with the alumina-containing slurry became the positive electrode current collect tab.

The insulating inorganic material layer 4 covered the first end surface 52 of the positive electrode active material-containing layer, and the portion of the front and back surfaces of the positive electrode tab adjacent to the first end surface 52, as illustrated in FIG. 12.

Figure 22:
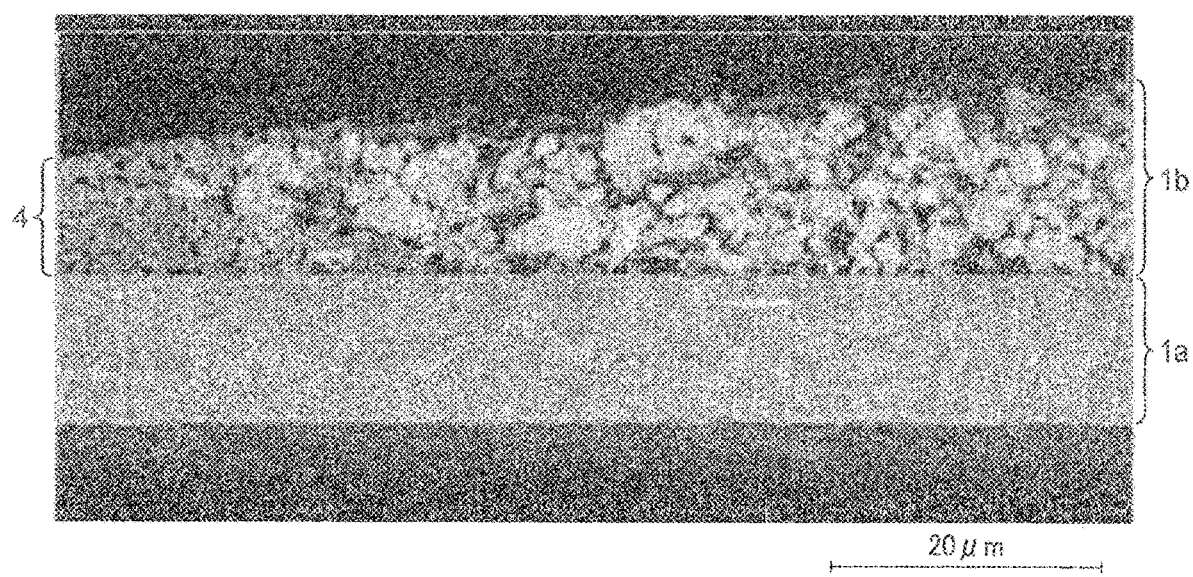
FIG. 22 is a cross-sectional scanning electron microscope (SEM) photograph of an end portion including a first end surface of a positive electrode active material-containing layer in Example 3.

The thickness of each of the positive electrode active material-containing layers was 20 μm, the thickness of the insulating inorganic material layer on the positive electrode active material-containing layer was 3 μm, and the thickness of the insulating inorganic material layer formed on the aluminum foil beyond the positive electrode active material-containing layer was 20 μm. The thickness T1 of the first end surface was 5 μm, and the thickness T2 of the second end surface was 20 μm. The shape of the end portion including the first end surface was as illustrated in FIG. 5. FIG. 22 illustrates a scanning electron microscope (SEM) photograph of a cross-section of the vicinity of the end portion including the first end surface, cut along the first direction which is an extending direction of a current collector tab. As illustrated in FIG. 22, the thickness of the positive electrode active material-containing layer 1b containing a large number of particles becomes thinner toward the current collector tab side, and the vicinity of the first end surface faces the positive electrode current collector 1a through the first film 4. The first film 4 covers the front surfaces of the positive electrode active material-containing layer 1b and the positive electrode current collector 1a. The thickness of the first film 4 is thicker in the portion in contact with the front surface of the positive electrode current collector 1a than in the portion in contact with the front surface of the positive electrode active material-containing layer 1b.

A negative electrode having a second film formed thereon was produced in the same manner as in Example 1.

Example 4

A laminate including a positive electrode, a first film, a second film, and a negative electrode was produced in the same manner as in Example 1, except that polyamide imide (PAI) was used instead of polyimide as an organic material.

Example 5

A laminate including a positive electrode, a first film, a second film, and a negative electrode was produced in the same manner as in Example 2, except that polyamide imide (PAI) was used instead of polyimide as an organic material.

Example 6

A laminate including a positive electrode, a first film, a second film, and a negative electrode was produced in the same manner as in Example 3, except that polyamide imide (PAI) was used instead of polyimide as an organic material.

Comparative Example

A positive electrode active material-containing layer, an insulating inorganic material layer on a positive electrode current collecting tab region, a negative electrode active material-containing layer, and a nanofiber layer on the negative electrode active material-containing layer were produced by the following method.

A positive electrode slurry was prepared in the same manner as in Example 1.

Alumina-containing slurry II was prepared by dispersing, in water, 100 parts by mass of $Al_2O_3$ particles having an average particle size of 1 μm as an inorganic material, 1 part by mass of carboxymethyl cellulose (CMC), and 4 parts by mass of an acrylic binder.

Next, alumina-containing slurry II was coated onto a portion of a positive electrode coating side of the positive electrode tab region on an aluminum foil having a thickness of 15 μm so as to have a wet thickness of 10 μm, and was then dried. This was performed on both sides of the aluminum foil.

Figure 21:
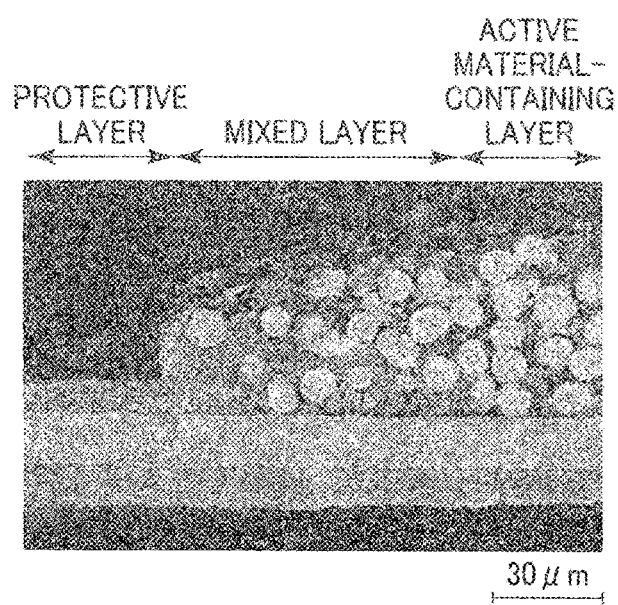
FIG. 21 is a cross-sectional scanning electron microscope (SEM) photograph of a cross-section near an end surface of a positive electrode active material-containing layer in Comparative Example.

Next, a positive electrode slurry was coated onto portions other than the tab region on the aluminum foil, and was then dried. This was performed on both sides of the aluminum foil. After that, roll pressing was performed, and cutting to a predetermined size was performed to obtain a positive electrode. The thickness of each of the positive electrode active material-containing layers was 20 μm, and the thickness of each of the insulating inorganic material layers was 5 μm. When the vicinity of the end surface adjacent to the tab region in the positive electrode active material-containing layer was observed with SEM, a mixed layer of the positive electrode active material and the inorganic material was present in the vicinity of the end surface, and the insulating inorganic material layer (protective layer) on the tab region was adjacent to the mixed layer. The SEM photograph is shown in FIG. 21.

It is to be noted that a portion not supporting the positive electrode active material-containing layer and the alumina-containing layer was provided on one long side of the current collector, and this portion was used as the positive electrode current collecting tab.

A negative electrode was produced in the same manner as in Example 1. As in Example 1, organic fibers were deposited on the negative electrode by an electrospinning method to form a nanofiber layer.

A wound electrode group coil was produced by using the positive electrode and the negative electrode respectively obtained in each of the examples and Comparative example. This was inserted into a container having an inner dimension of 110 mm×20 mm and a height of 100 mm, a resistance value was measured by using HIOKI's Milliohm High Tester 3650, and an occurrence rate of an internal short circuit was examined. With regard to the internal short circuit, a tester value of 1,000Ω or less was defined as the internal short circuit. The results are shown in Table 1.

TABLE 1

| | | Number of Windings (Positive Electrode/Negative Electrode) | | | | | |
|---|---|---|---|---|---|---|---|
| | | 60/60 | 64/64 | 65/65 | 66/66 | 67/67 | 68/68 |
| | | Initial Capacity (Ah) | | | | | |
| | | 18.7 | 20.9 | 21.4 | 21.7 | 22.1 | 22.5 |
| Internal Short Circuit Occurrence Rate (%) | Example 1 | 0 | 0 | 0 | 0 | 0 | 0 |
| | Example 2 | 0 | 0 | 0 | 0 | 0 | 0 |
| | Example 3 | 0 | 0 | 10 | 10 | 10 | 10 |
| | Example 4 | 0 | 0 | 0 | 0 | 0 | 0 |
| | Example 5 | 0 | 0 | 0 | 0 | 0 | 0 |
| | Example 6 | 0 | 0 | 10 | 10 | 10 | 20 |
| | Comparative Example | 0 | 10 | 50 | 70 | 100 | 100 |

From the comparison between the examples and Comparative example, in the electrode group of Comparative Example having the 5 μm alumina-containing layer including the acrylic binder formed on the current collector tab region of the positive electrode, the internal short circuit occurrence rate increased as the number of windings increased, but according to the electrode group of Examples 1 to 6, no internal short circuit occurred when wound 64 turns. Therefore, the initial capacities of the secondary batteries of Examples 1 to 6 were 20.9 Ah or more, while the initial capacity of the secondary battery of Comparative Example was 18.7 Ah. In addition, according to the electrode groups of Examples 1, 2, 4, and 5, no internal short circuit occurred even when wound 68 turns. Therefore, the initial capacities of the secondary batteries of Examples 1, 2, 4, and 5 can be increased to 22.5 Ah. From this, it is understood that, according to the laminates of the examples, the secondary battery with high capacity and long life can be realized by eliminating the internal short circuit which hinders high capacity.

In the laminates according to at least one embodiment and example described above, the first film containing the inorganic material covers at least the first end surface of the first active material-containing layer and the portion among the front and back surfaces of the first current collector tab that is adjacent to the first end surface. In addition, the thickness defined at the first end surface of the first active material-containing layer is smaller than the thickness defined at the second end surface of the first active material-containing layer facing in the opposite direction from the first end surface. As a result, since peeling of the first film from the first active material-containing layer can be suppressed, it is possible to eliminate an internal short circuit which is a factor hindering the increase in capacity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A laminate comprising:
   a first current collector that comprises a first collector front surface and a first collector back surface;
   a first current collector tab that extends from the first current collector in a first direction;
   a first active material-containing layer that comprises a first layer front surface and a first layer back surface, the first layer back surface being supported on at least a part among the first collector front surface and the first collector back surface of the first current collector, the first active material-containing layer comprising a first end surface adjacent to the first current collector tab and a second end surface facing in a reverse direction with respect to the first end surface;
   a first film that comprises an inorganic material;
   a second active material-containing layer that faces the first active material-containing layer;
   a second film between the first active material-containing layer and the second active material-containing layer, the second film comprising an organic fiber;
   a second current collector that comprises a second collector front surface and a second collector back surface; and
   a second current collector tab that extends from the second current collector in a second direction which is opposite to the first direction,
   wherein a first thickness defined at the first end surface of the first active material-containing layer is smaller than a second thickness defined at the second end surface of the first active material-containing layer;
   the first film covers at least the first end surface of the first active material-containing layer and a portion among a first tab front surface and a first tab back surface of the first current collector tab adjacent to the first end surface;
   a thickness of the first active material-containing layer decreases along the first direction, and the first thickness defined at the first end surface is a minimum value thereof,
   the first film further covers the entire first layer front surface of the first active material-containing layer;
   the second active material-containing layer comprises a second layer front surface and a second layer back surface, the second layer back surface being supported on at least a part among the second collector front surface and the second collector back surface of the second current collector, the second active material-containing layer comprising a third end surface adjacent to the second current collector tab and a fourth end surface facing in a reverse direction with respect to the third end surface; and
   the second film directly contacts the third end surface of the second active material-containing layer, and the portion of the second current collector tab that is adjacent to the third end surface of the second active material-containing layer on the front-surface of the second current collector tab.

2. The laminate according to claim 1, wherein a first film thickness of the first film decreases along the first direction.

3. The laminate according to claim 1, wherein a first film portion thickness of a first portion of the first film covering the first current collector tab is thicker than a second film portion thickness of a second portion of the first film covering the first layer front surface of the first active material-containing layer.

4. The laminate according to claim 1, wherein the second film is integrated with the first film, the second active material-containing layer, or both the first film and the second active material-containing layer.

5. The laminate according to claim 1, wherein the second active material-containing layer comprises a titanium-containing oxide as an active material.

6. A secondary battery comprising the laminate according to claim 1.

7. The laminate according to claim 1, wherein
the organic fiber includes at least one organic material selected from the group consisting of polyamide imide, polyamide, polyolefin, polyether, polyimide, polyketone, polysulfone, cellulose, polyvinyl alcohol (PVA), and polyvinylidene fluoride (PVdF).

8. The laminate according to claim 1, wherein
the porosity of the second film is 70% to 90%.

9. The laminate according to claim 1, wherein
the second film directly covers the portion of the second current collector tab that is adjacent to the third end surface of the second active material-containing layer on the front surface of the second current collector tab.

* * * * *